(12) United States Patent
Hsueh et al.

(10) Patent No.: US 9,952,412 B2
(45) Date of Patent: Apr. 24, 2018

(54) IMAGING LENS SYSTEM, IMAGE CAPTURING UNIT AND ELECTRONIC DEVICE

(71) Applicant: LARGAN Precision Co., Ltd., Taichung (TW)

(72) Inventors: Chun-Che Hsueh, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/354,695

(22) Filed: Nov. 17, 2016

(65) Prior Publication Data

US 2018/0059375 A1    Mar. 1, 2018

(30) Foreign Application Priority Data

Aug. 26, 2016 (TW) .............................. 105127476 A

(51) Int. Cl.
| | | |
|---|---|---|
| G02B 3/02 | (2006.01) | |
| G02B 13/00 | (2006.01) | |
| G02B 5/00 | (2006.01) | |
| G02B 5/20 | (2006.01) | |
| G02B 27/00 | (2006.01) | |
| G02B 9/62 | (2006.01) | |

(52) U.S. Cl.
CPC ......... *G02B 13/0045* (2013.01); *G02B 5/005* (2013.01); *G02B 5/208* (2013.01); *G02B 9/62* (2013.01); *G02B 27/0025* (2013.01)

(58) Field of Classification Search
CPC ........................................................ G02B 9/64
USPC .......................................................... 359/713
See application file for complete search history.

(56) References Cited

U.S. PATENT DOCUMENTS

| | | | |
|---|---|---|---|
| 8,335,043 B2 | 12/2012 | Huang | |
| 9,158,094 B1 | 10/2015 | Chen et al. | |
| 9,164,258 B1 | 10/2015 | Chen et al. | |
| 9,335,518 B2 | 5/2016 | Chen et al. | |
| 2015/0268446 A1* | 9/2015 | Chen ....................... | G02B 9/62 348/148 |
| 2016/0033746 A1 | 2/2016 | Chen et al. | |
| 2016/0124185 A1 | 5/2016 | Tang et al. | |

(Continued)

FOREIGN PATENT DOCUMENTS

WO    2014192567    12/2014

*Primary Examiner* — James Jones
(74) *Attorney, Agent, or Firm* — Hanley, Flight & Zimmerman, LLC

(57) ABSTRACT

An imaging lens system includes, in order from an object side to an image side, a first lens element, a second lens element, a third lens element, a fourth lens element, a fifth lens element and a sixth lens element. The first lens element has negative refractive power. The third lens element and the fourth lens element both have positive refractive power. The fifth lens element with negative refractive power has an image-side surface being concave in a paraxial region thereof, wherein an object-side surface and the image-side surface thereof are aspheric. The sixth lens element has an image-side surface being concave in a paraxial region thereof, wherein the image-side surface of the sixth lens element has at least one inflection point in an off-axial region thereof, and an object-side surface and the image-side surface thereof are aspheric. The imaging lens system has a total of six lens elements.

25 Claims, 19 Drawing Sheets

(56) References Cited

U.S. PATENT DOCUMENTS

2016/0124187 A1 5/2016 Chen et al.
2016/0124188 A1 5/2016 Chen et al.

* cited by examiner

IMAGING LENS SYSTEM, IMAGE CAPTURING UNIT AND ELECTRONIC DEVICE

RELATED APPLICATION

This application claims priority to Taiwan Application 105127476, filed Aug. 26, 2016, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of smart electronic devices, such as vehicle devices, image recognition systems, entertainment devices, sport devices and intelligent home assistance systems, for various requirements. In order to provide better user experience, the electronic device equipped with one or more optical systems having different fields of view has become the mainstream product in the market. For various applications, the optical systems are developed with various optical characteristics, such that there is an increasing demand for optical system featuring wide field of view, and the specifications of the optical system are also harder to satisfy.

However, the conventional optical system is unable to satisfy the requirements of wide field of view and compact size simultaneously, such that it is difficult to be adopted for use in current compact electronic devices. Thus, there is a need to develop an optical system featuring wide viewing angle, compact size and high image quality.

SUMMARY

According to one aspect of the present disclosure, an imaging lens system includes, in order from an object side to an image side, a first lens element, a second lens element, a third lens element, a fourth lens element, a fifth lens element and a sixth lens element. The first lens element has negative refractive power. The third lens element has positive refractive power. The fourth lens element has positive refractive power. The fifth lens element with negative refractive power has an image-side surface being concave in a paraxial region thereof, wherein an object-side surface and the image-side surface of the fifth lens element are both aspheric. The sixth lens element has an image-side surface being concave in a paraxial region thereof, wherein the image-side surface of the sixth lens element has at least one inflection point in an off-axial region thereof, and an object-side surface and the image-side surface of the sixth lens element are both aspheric. The imaging lens system has a total of six lens elements, and each of the lens elements of the imaging lens system is a single and non-cemented lens element. When an axial distance between the fifth lens element and the sixth lens element is T56, a central thickness of the sixth lens element is CT6, a sum of axial distances between every two lens elements of the imaging lens system adjacent to each other is ΣAT, and the following conditions are satisfied:

$1.05 < T56/CT6 < 7.50$; and $1.0 < \Sigma AT/T56 < 2.25$.

According to another aspect of the present disclosure, an imaging lens system includes, in order from an object side to an image side, a first lens element, a second lens element, a third lens element, a fourth lens element, a fifth lens element and a sixth lens element. The first lens element has negative refractive power. The third lens element has positive refractive power. The fourth lens element has positive refractive power. The fifth lens element with negative refractive power has an image-side surface being concave in a paraxial region thereof, wherein an object-side surface and the image-side surface of the fifth lens element are both aspheric. The sixth lens element has an image-side surface being concave in a paraxial region thereof, wherein the image-side surface of the sixth lens element has at least one inflection point in an off-axial region thereof, and an object-side surface and the image-side surface of the sixth lens element are both aspheric. The imaging lens system has a total of six lens elements, and each of the lens elements of the imaging lens system is a single and non-cemented lens element. When an axial distance between the fifth lens element and the sixth lens element is T56, a central thickness of the sixth lens element is CT6, a curvature radius of the object-side surface of the fifth lens element is R9, a curvature radius of the image-side surface of the fifth lens element is R10, and the following conditions are satisfied:

$1.05 < T56/CT6 < 7.50$; and $0.50 < (R9+R10)/(R9-R10) < 3.50$.

According to another aspect of the present disclosure, an image capturing unit includes one of the aforementioned imaging lens system and an image sensor, wherein the image sensor is disposed on an image surface of the imaging lens system.

According to still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
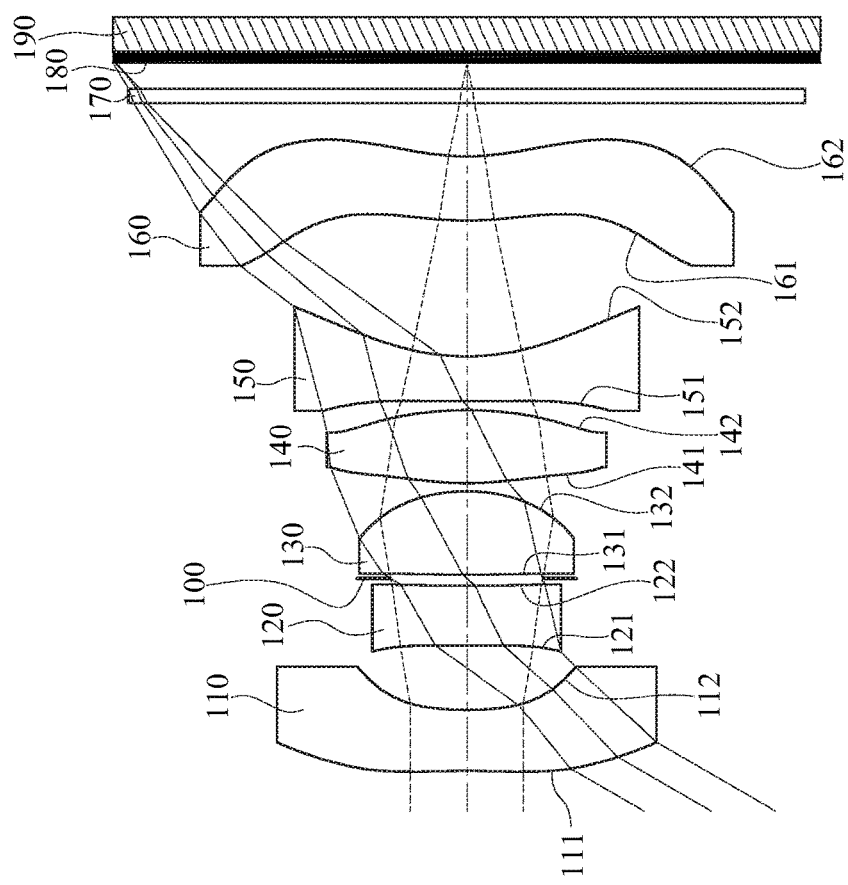
FIG. 1 is a schematic view of an image capturing unit according to the 1st embodiment of the present disclosure.

An imaging lens system includes, in order from an object side to an image side, a first lens element, a second lens element, a third lens element, a fourth lens element, a fifth lens element and a sixth lens element. The imaging lens system has a total of six lens elements.

There can be an air gap in a paraxial region between every two lens elements of the imaging lens system that are adjacent to each other; that is, each of the first through the sixth lens elements can be a single and non-cemented lens element. The manufacturing process of the cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to displacement and it is thereby not favorable for the image quality. Therefore, having an air gap in a paraxial region between every two lens elements of the imaging lens system that are adjacent to each other in the present disclosure can avoid the problem generated by the cemented lens elements while improving the yield rate.

The first lens element with negative refractive power can have an object-side surface being concave in a paraxial region thereof, wherein the object-side surface of the first lens element can have at least one convex shape in an off-axial region thereof. Therefore, it is favorable for gathering light from a large view angle in the imaging lens system.

The third lens element has positive refractive power. Therefore, it is favorable for correcting aberrations generated by the first lens element.

The fourth lens element has positive refractive power. Therefore, it is favorable for balancing the refractive power distribution of the imaging lens system so as to reduce the sensitivity.

The fifth lens element with negative refractive power has an image-side surface being concave in a paraxial region thereof. Therefore, it is favorable for properly arranging the refractive power distribution among the third, the fourth and the fifth lens elements so as for light converging on an image surface while reducing the back focal length to maintain a compact size thereof.

The sixth lens element has an image-side surface being concave in a paraxial region thereof, wherein the image-side surface of the sixth lens element has at least one inflection point in an off-axial region thereof. Therefore, it is favorable for reducing the back focal length and correcting aberrations at the off-axial region.

When an axial distance between the fifth lens element and the sixth lens element is T56, a central thickness of the sixth lens element is CT6, the following condition is satisfied: $1.05<T56/CT6<7.50$. Therefore, it is favorable for providing sufficient space between the fifth lens element and the sixth lens element so as to prevent molding and assembling problems generated by overly short axial distance in the off-axial region. Preferably, the following condition can also be satisfied: $1.60<T56/CT6<4.0$.

When a sum of axial distances between every two lens elements of the imaging lens system adjacent to each other is ΣAT, the axial distance between the fifth lens element and the sixth lens element is T56, the following condition is satisfied: $1.0<\Sigma AT/T56<2.25$. Therefore, it is favorable for preventing the axial distances between every two lens elements that are adjacent to each other from overly large so that the internal space of the imaging lens system can be effectively used, thereby satisfying the requirements of short track length and compact size. Preferably, the following condition can also be satisfied: $1.20<\Sigma AT/T56<2.10$.

When a curvature radius of an object-side surface of the fifth lens element is R9, a curvature radius of the image-side surface of the fifth lens element is R10, the following condition is satisfied: $0<(R9+R10)/(R9-R10)<3.50$. Therefore, it is favorable for properly arranging the shape of the fifth lens element in accordance with the shapes of the third and the fourth lens elements for correcting aberrations generated by the third and the fourth lens elements with stronger positive refractive power. Preferably, the following condition can also be satisfied: $0.50<(R9+R10)/(R9-R10)<3.50$. More preferably, the following condition can also be satisfied: $1.0<(R9+R10)/(R9-R10)<3.50$.

When a curvature radius of the object-side surface of the first lens element is R1, a curvature radius of an image-side surface of the first lens element is R2, the following condition can be satisfied: $-1.50<(R1+R2)/(R1-R2)<2.0$. Therefore, the surface curvatures of the first lens element are properly arranged so that it is favorable for enlarging the field of view and correcting aberrations.

When a focal length of the imaging lens system is f, an entrance pupil diameter of the imaging lens system is EPD, the following condition can be satisfied: $1.0<f/EPD<3.0$. Therefore, it is favorable for providing sufficient incident light so as to improve the image quality.

When a curvature radius of an object-side surface of the sixth lens element is R11, a curvature radius of the image-side surface of the sixth lens element is R12, the following condition can be satisfied: $|(R11-R12)/(R11+R12)|<0.35$. Therefore, it is favorable for arranging the refractive power of the sixth lens element so that excessive aberration corrections due to overly strong refractive power of the sixth lens element is prevented; furthermore, it is favorable for reducing the difference between the central thickness and the peripheral thickness of the sixth lens element so as to prevent molding problems.

When an axial distance between the object-side surface of the first lens element and the image surface is TL, the focal length of the imaging lens system is f, half of a maximal field of view of the imaging lens system is HFOV, the following condition can be satisfied: $TL/[f*\tan(HFOV)]<1.75$. Therefore, it is favorable for further enlarging the field of view and keeping the imaging lens system compact.

When the focal length of the imaging lens system is f, a curvature radius of an object-side surface of the second lens element is R3, a curvature radius of an image-side surface of the second lens element is R4, the following condition can be satisfied: $|f/R3|+|f/R4|<1.50$. Therefore, it is favorable for gathering light in the imaging lens system so as to prevent overly small light cone generated by overly fast light convergence, thereby improving relative luminance at the peripheral region of the image.

When the sum of axial distances between every two lens elements of the imaging lens system adjacent to each other is ΣAT, an axial distance between the second lens element and the third lens element is T23, an axial distance between the third lens element and the fourth lens element is T34, an axial distance between the fourth lens element and the fifth lens element is T45, the following condition can be satisfied: $4<\Sigma AT/(T23+T34+T45)<25$. Therefore, it is favorable for preventing the axial distances among the second through the fifth lens elements from overly large so as to provide better lens configuration.

When the focal length of the imaging lens system is f, the curvature radius of the image-side surface of the sixth lens element is R12, the following condition can be satisfied: $0.20<R12/f<1.25$. Therefore, it is favorable for moving the principal point of the imaging lens system towards the object side so as to reduce the back focal length while keeping the imaging lens system compact.

When a maximum among all central thicknesses of the lens elements of the imaging lens system is CTmax, the axial distance between the fifth lens element and the sixth lens element is T56, the following condition can be satisfied: $CTmax/T56<1.25$. Therefore, it is favorable for preventing the thickness of a single lens element from overly large so that the space in the imaging lens system can be effectively used; furthermore, it is favorable for arranging the central thicknesses of the lens elements so as to reduce molding problems.

When an Abbe number of the fourth lens element is V4, an Abbe number of the fifth lens element is V5, an Abbe number of the sixth lens element is V6, the following condition can be satisfied: $0.30<(V5+V6)/V4<1.0$. Therefore, it is favorable for obtaining a balance between the astigmatism correction and the chromatic aberration correction while reducing the effective radius of the sixth lens element so as to maintain a compact size thereof.

Figure 16:
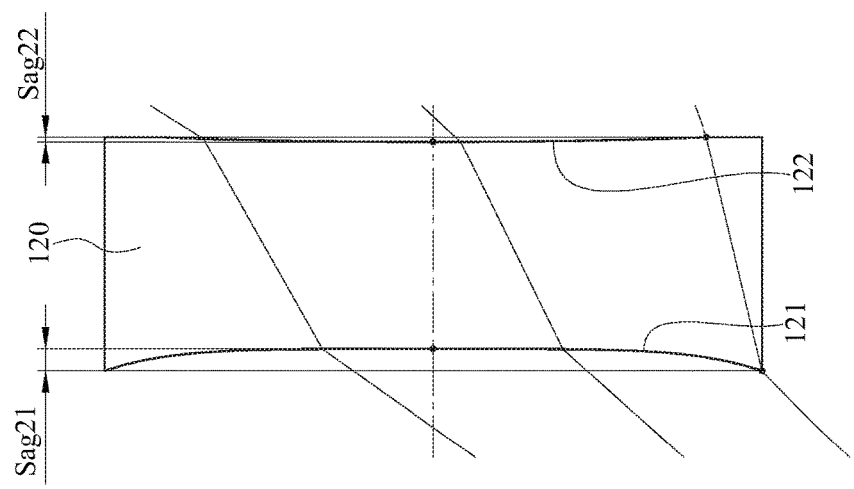
FIG. 16 shows a schematic view of the parameters Sag21 and Sag22 according to the 1st embodiment of the present disclosure.

When a displacement in parallel with an optical axis from an axial vertex of the object-side surface of the second lens element to a maximum effective radius position of the object-side surface of the second lens element is Sag21, a displacement in parallel with the optical axis from an axial vertex of the image-side surface of the second lens element to a maximum effective radius position of the image-side surface of the second lens element is Sag22, a central thickness of the second lens element is CT2, the following condition can be satisfied: $(|Sag21|+|Sag22|)/CT2<0.25$. Therefore, when the central thickness of the second lens element is thinner, it is favorable for preventing the surfaces of the second lens element from overly curved and complex so as to reduce molding problems. As seen in FIG. 16, it shows a schematic view of the parameters Sag21 and Sag22 in FIG. 1. When the direction from the axial vertex of the surface to the maximum effective radius position of the surface is facing towards the image side of the imaging lens system, the value of the Sag21 or Sag22 is positive; otherwise, the value is negative.

When a curvature radius of an object-side surface of the third lens element is R5, a curvature radius of an image-side surface of the third lens element is R6, the following condition can be satisfied: $0.50<(R5+R6)/(R5-R6)<3.0$. Therefore, the third lens element arranged with the negative first lens element is favorable for projecting light on the image surface while correcting aberrations generated by the first lens element.

When the maximal field of view of the imaging lens system is HFOV, the following condition can be satisfied: $100[deg.]<FOV<160[deg.]$. Therefore, it is favorable for providing the imaging lens system with sufficient imaging range while reducing distortions.

When the axial distance between the object-side surface of the first lens element and the image surface is TL, a maximum image height of the imaging lens system (which can be measured in half of a diagonal length of an effective photosensitive area of an image sensor) is ImgH, the following condition can be satisfied: $1.0<TL/ImgH<2.30$. Therefore, it is favorable for miniaturizing the imaging lens system so as to be equipped in a compact electronic device.

When a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the x-th lens element is fx, the following condition can be satisfied: $|fx|<|f2|$, wherein $x=1, 3, 4, 5, 6$. Therefore, it is favorable for balancing the refractive power distribution so as to prevent excessive refraction and generating surface internal reflection.

According to the present disclosure, at least three of the lens elements of the imaging lens system can have an Abbe number smaller than 30. In detail, there can be three or more lens elements whose Abbe numbers are smaller than 30 among the first lens element, the second lens element, the third lens element, the fourth lens element, the fifth lens element and the sixth lens element. Therefore, it is favorable for balancing the focusing positions with different wavelengths so as to correct chromatic aberrations.

Figure 15:
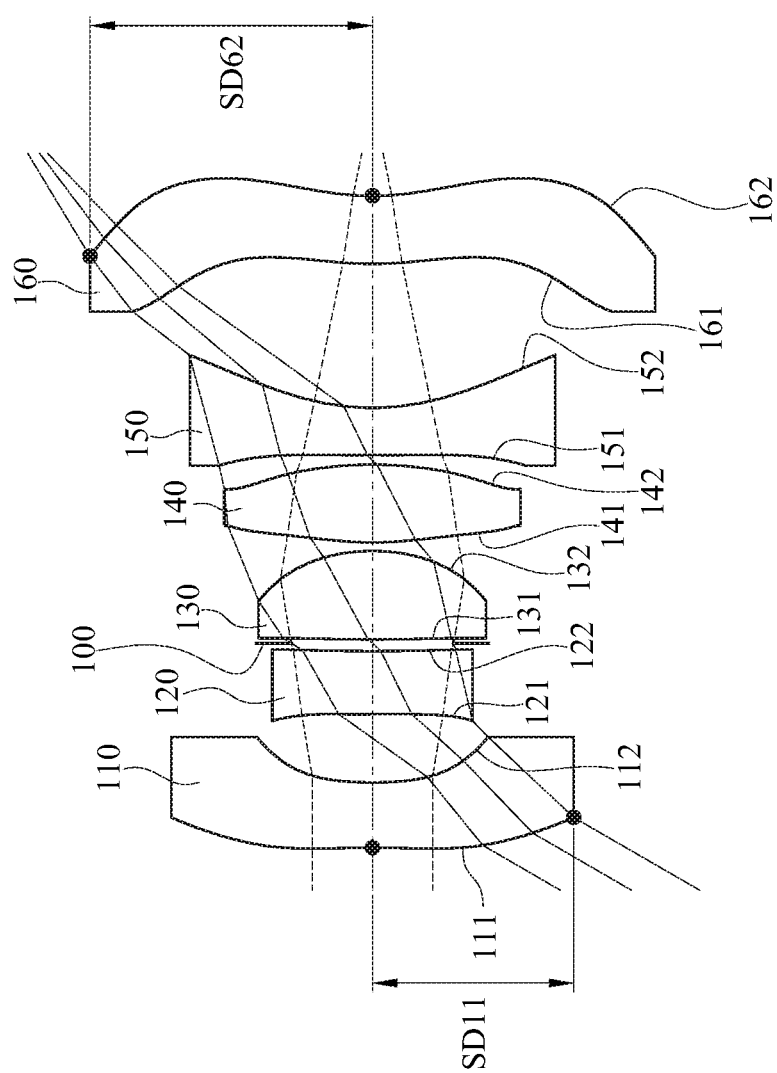
FIG. 15 shows a schematic view of the parameters SD11 and SD62 according to the 1st embodiment of the present disclosure.

When a maximum effective radius of the object-side surface of the first lens element is SD11, a maximum effective radius of the image-side surface of the sixth lens element is SD62, the following condition can be satisfied: $|SD11/SD62|<1.20$. Therefore, it is favorable for reducing the size of the first lens element so as to keep the imaging lens system compact. As seen in FIG. 15, it shows a schematic view of the parameters SD11 and SD62 in FIG. 1.

According to the present disclosure, the lens elements of the imaging lens system can be made of glass or plastic material. When the lens elements are made of glass material, the refractive power distribution of the imaging lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging lens system can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the imaging lens system on a corresponding image sensor can be flat or curved, particularly a concave curved surface facing towards the object side of the imaging lens system.

According to the present disclosure, the imaging lens system can include at least one stop, such as an aperture stop, a glare stop or a field stop. Said glare stop or said field stop is allocated for eliminating the stray light and thereby improving the image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned imaging lens system and image sensor, wherein the image sensor is disposed on the image side and can be located on or near the image surface of the aforementioned imaging lens system. In some embodiments, the image capturing unit can further include a barrel member, a holder member or a combination thereof.

Figure 17:
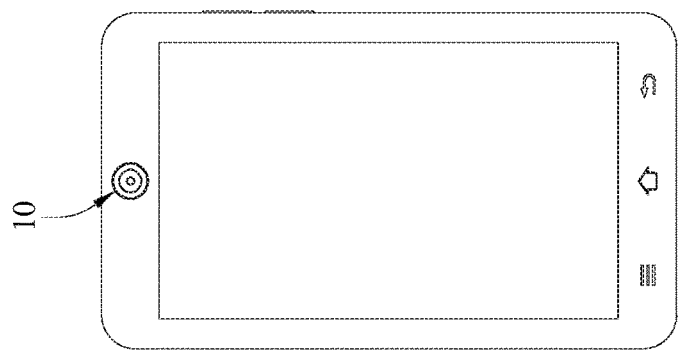
FIG. 17 shows an electronic device according to one embodiment.
Figure 18:
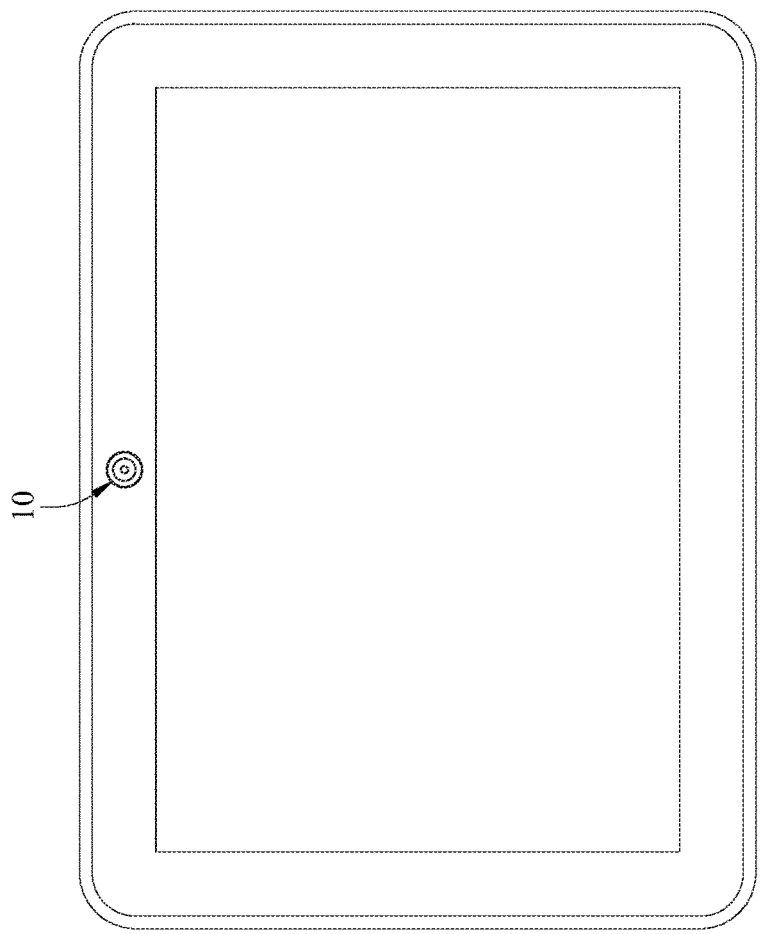
FIG. 18 shows an electronic device according to another embodiment.
Figure 19:
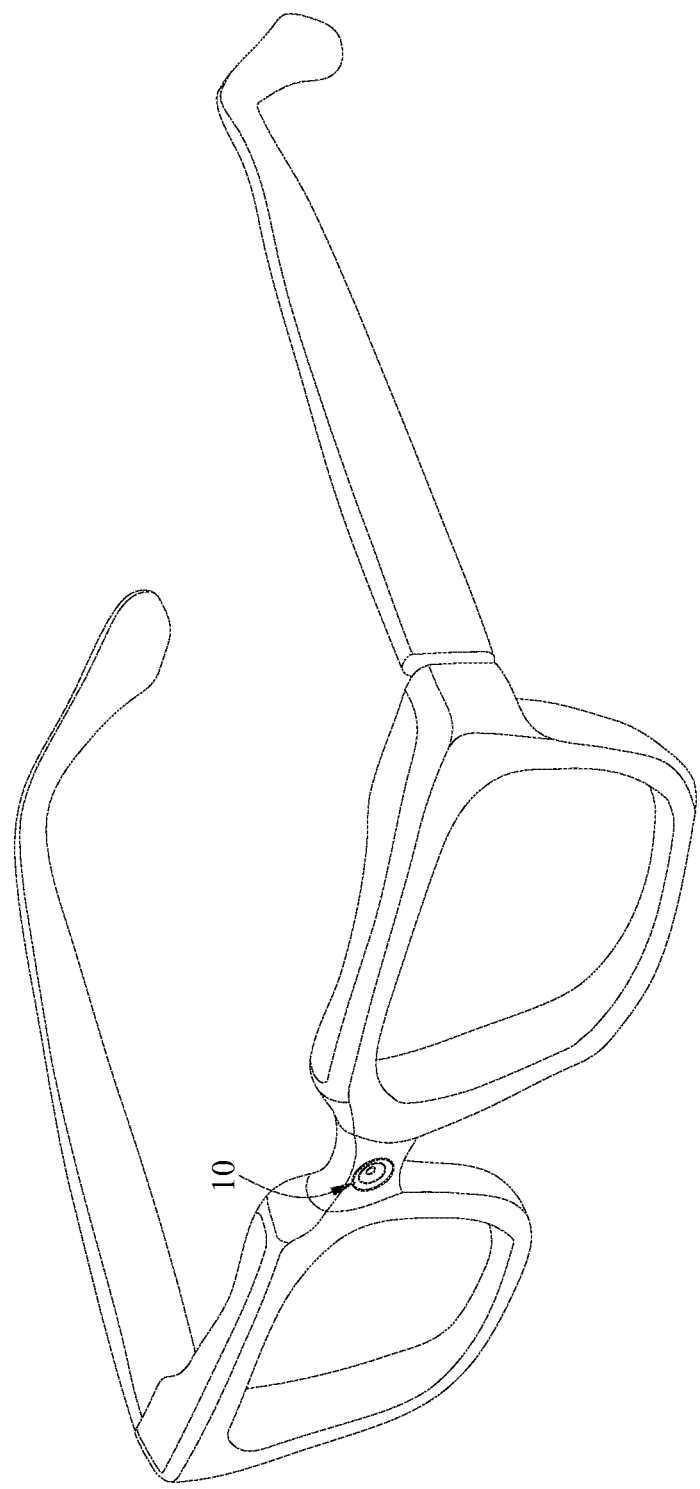
FIG. 19 shows an electronic device according to still another embodiment.

In FIG. 17, FIG. 18 and FIG. 19, an image capturing unit 10 may be installed in, but not limited to, an electronic device, including a smartphone (FIG. 17), a tablet computer (FIG. 18) or a wearable device (FIG. 19). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging lens system can be optionally applied to optical systems with a movable focus. Furthermore, the imaging lens system is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
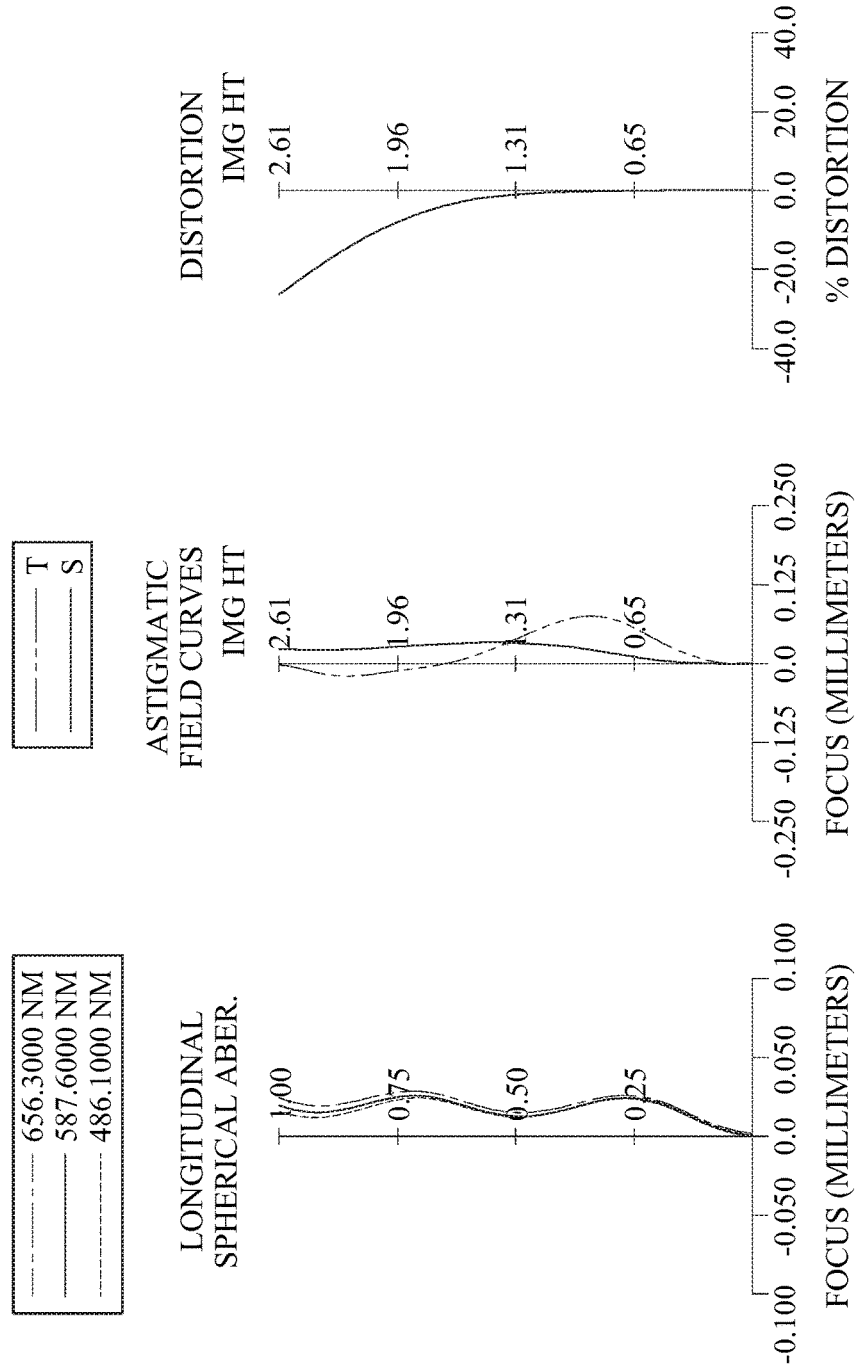
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens system (its reference numeral is omitted) of the present disclosure and an image sensor 190. The imaging lens system includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the imaging lens system has a total of six single and non-cemented lens elements (110-160).

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one convex shape in an off-axial region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point in an off-axial region thereof.

The IR-cut filter 170 is made of glass material and located between the sixth lens element 160 and the image surface 180, and will not affect the focal length of the imaging lens system. The image sensor 190 is disposed on or near the image surface 180 of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens system of the image capturing unit according to the 1st embodiment, when a focal length of the imaging lens system is f, an f-number of the imaging lens system is Fno, and half of a maximal field of view of the imaging lens system is HFOV, these parameters have the following values: f=2.08 millimeters (mm), Fno=f/EPD=2.45; and HFOV=60.0 degrees (deg.).

When the maximal field of view of the imaging lens system is FOV, the following condition is satisfied: FOV=120 deg.

When an Abbe number of the fourth lens element 140 is V4, an Abbe number of the fifth lens element 150 is V5, an Abbe number of the sixth lens element 160 is V6, the following condition is satisfied: (V5+V6)/V4=0.77.

When a maximum among all central thicknesses of the lens elements (110-160) of the imaging lens system is CTmax, an axial distance between the fifth lens element 150 and the sixth lens element 160 is T56, the following condition is satisfied: CTmax/T56=0.61.

When the axial distance between the fifth lens element 150 and the sixth lens element 160 is T56, a central thickness of the sixth lens element 160 is CT6, the following condition is satisfied: T56/CT6=2.12.

When a sum of axial distances between every two lens elements of the imaging lens system adjacent to each other is ΣAT, an axial distance between the second lens element 120 and the third lens element 130 is T23, an axial distance between the third lens element 130 and the fourth lens element 140 is T34, an axial distance between the fourth lens element 140 and the fifth lens element 150 is T45, the following condition is satisfied: ΣAT/(T23+T34+T45)=8.12.

When the sum of axial distances between every two lens elements of the imaging lens system adjacent to each other is ΣAT, the axial distance between the fifth lens element 150 and the sixth lens element 160 is T56, the following condition is satisfied: ΣAT/T56=1.68.

When an axial distance between the object-side surface 111 of the first lens element 110 and the image surface 180 is TL, a maximum image height of the imaging lens system is ImgH, the following condition is satisfied: TL/ImgH=2.03.

When the axial distance between the object-side surface 111 of the first lens element 110 and the image surface 180 is TL, half of the maximal field of view of the imaging lens system is HFOV, the following condition is satisfied: TL/[f*tan(HFOV)]=1.47.

When a curvature radius of the object-side surface 111 of the first lens element 110 is R1, a curvature radius of the image-side surface 112 of the first lens element 110 is R2, the following condition is satisfied: (R1+R2)/(R1−R2)=0.31.

When a curvature radius of the object-side surface 131 of the third lens element 130 is R5, a curvature radius of the image-side surface 132 of the third lens element 130 is R6, the following condition is satisfied: (R5+R6)/(R5−R6)=0.88.

When a curvature radius of the object-side surface 151 of the fifth lens element 150 is R9, a curvature radius of the image-side surface 152 of the fifth lens element 150 is R10, the following condition is satisfied: (R9+R10)/(R9−R10)=0.78.

When a curvature radius of the object-side surface 161 of the sixth lens element 160 is R11, a curvature radius of the image-side surface 162 of the sixth lens element 160 is R12, the following condition is satisfied: |(R11−R12)/(R11+R12)|=0.17.

When the focal length of the imaging lens system is f, the curvature radius of the image-side surface 162 of the sixth lens element 160 is R12, the following condition is satisfied: R12/f=0.89.

When the focal length of the imaging lens system is f, a curvature radius of the object-side surface 121 of the second lens element 120 is R3, a curvature radius of the image-side surface 122 of the second lens element 120 is R4, the following condition is satisfied: |f/R3|+|f/R4|=0.09.

When a displacement in parallel with an optical axis from an axial vertex of the object-side surface 121 of the second lens element 120 to a maximum effective radius position of the object-side surface 121 of the second lens element 120 is Sag21, a displacement in parallel with the optical axis from an axial vertex of the image-side surface 122 of the second lens element 120 to a maximum effective radius position of the image-side surface 122 of the second lens element 120 is Sag22, a central thickness of the second lens element 120 is CT2, the following condition is satisfied: (|Sag21|+|Sag22|)/CT2=0.13.

When a maximum effective radius of the object-side surface 111 of the first lens element 110 is SD11, a maximum effective radius of the image-side surface 162 of the sixth lens element 160 is SD62, the following condition is satisfied: |SD11/SD62|=0.71.

In this embodiment, three of the lens elements (110-160) of the imaging lens system has an Abbe number smaller than 30. In detail, the Abbe numbers of the second lens element 120, the fifth lens element 150 and the sixth lens element 160 are all smaller than 30.

The detailed optical data of the 1st embodiment are shown in Table 1 and the aspheric surface data are shown in Table 2 below.

TABLE 1

1st Embodiment
f = 2.08 mm, Fno = 2.45, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.660 | (ASP) | 0.459 | Plastic | 1.545 | 56.0 | −3.50 |
| 2 | | 2.959 | (ASP) | 0.481 | | | | |
| 3 | Lens 2 | −100.000 | (ASP) | 0.444 | Plastic | 1.671 | 19.5 | −33.07 |
| 4 | | 28.553 | (ASP) | 0.055 | | | | |
| 5 | Ape. Stop | Plano | | 0.028 | | | | |
| 6 | Lens 3 | 24.094 | (ASP) | 0.622 | Plastic | 1.544 | 55.9 | 2.77 |
| 7 | | −1.594 | (ASP) | 0.060 | | | | |
| 8 | Lens 4 | 1.896 | (ASP) | 0.550 | Plastic | 1.544 | 55.9 | 2.03 |
| 9 | | −2.377 | (ASP) | 0.067 | | | | |
| 10 | Lens 5 | −15.054 | (ASP) | 0.333 | Plastic | 1.639 | 23.5 | −2.59 |
| 11 | | 1.871 | (ASP) | 1.014 | | | | |
| 12 | Lens 6 | 2.613 | (ASP) | 0.478 | Plastic | 1.671 | 19.5 | −12.61 |
| 13 | | 1.849 | (ASP) | 0.400 | | | | |
| 14 | IR-cut filter | Plano | | 0.110 | Glass | 1.517 | 64.2 | — |
| 15 | | Plano | | 0.191 | | | | |
| 16 | Image | Plano | | — | | | | |

Note:
Reference wavelength is 587.6 nm (d-line).

TABLE 2

Aspheric Coefficients

| | Surface # | | | | | |
|---|---|---|---|---|---|---|
| | 1 | 2 | 3 | 4 | 6 | 7 |
| k = | 3.2426E+00 | −8.9519E+01 | −3.6365E+01 | −6.6302E+01 | 9.0000E+01 | 1.9244E+00 |
| A4 = | 3.1862E−01 | 9.5726E−01 | −2.9768E−02 | 1.1393E−01 | 1.5430E−01 | −8.5996E−01 |
| A6 = | −3.1636E−01 | −1.4928E+00 | −4.4915E−01 | −4.5821E−01 | −6.2860E−01 | 4.2777E+00 |
| A8 = | 2.5649E−01 | 2.6402E+00 | 8.0357E−01 | 1.2364E+00 | 1.3694E+00 | −1.4194E+01 |
| A10 = | −1.4036E−01 | −2.0236E+00 | −1.8219E+00 | −3.7863E+00 | −3.2234E+00 | 2.8213E+01 |
| A12 = | 4.2315E−02 | −1.2491E−01 | 1.5702E+00 | 6.4294E+00 | 1.9730E+00 | −3.0697E+01 |
| A14 = | −5.1667E−03 | 6.4061E−01 | — | — | 3.1694E+00 | 1.3766E+01 |

| | Surface # | | | | | |
|---|---|---|---|---|---|---|
| | 8 | 9 | 10 | 11 | 12 | 13 |
| k = | −5.6603E+01 | −1.0883E+01 | 2.5373E+01 | −2.3742E+01 | −1.1654E+01 | −1.3661E+00 |
| A4 = | −9.0163E−02 | 1.3025E−01 | 3.0516E−01 | 4.6016E−01 | −1.3350E−01 | −1.8116E−01 |
| A6 = | 6.5860E−01 | −4.8367E−01 | −6.9029E−01 | −9.0471E−01 | −4.6654E−02 | 3.7284E−02 |
| A8 = | −2.4546E+00 | −3.2229E−01 | −2.5031E−01 | 1.0889E+00 | 9.7151E−02 | 1.9318E−02 |
| A10 = | 4.9000E+00 | 2.5431E+00 | 2.3564E+00 | −8.3990E−01 | −7.6190E−02 | −2.1789E−02 |
| A12 = | −5.4773E+00 | −3.6407E+00 | −3.2312E+00 | 3.9902E−01 | 3.2345E−02 | 8.3134E−03 |
| A14 = | 3.2881E+00 | 2.3358E+00 | 1.9467E+00 | −1.0576E−01 | −6.7032E−03 | −1.5235E−03 |
| A16 = | −8.1506E−01 | −5.7874E−01 | −4.5532E−01 | 1.1871E−02 | 5.3332E−04 | 1.1242E−04 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
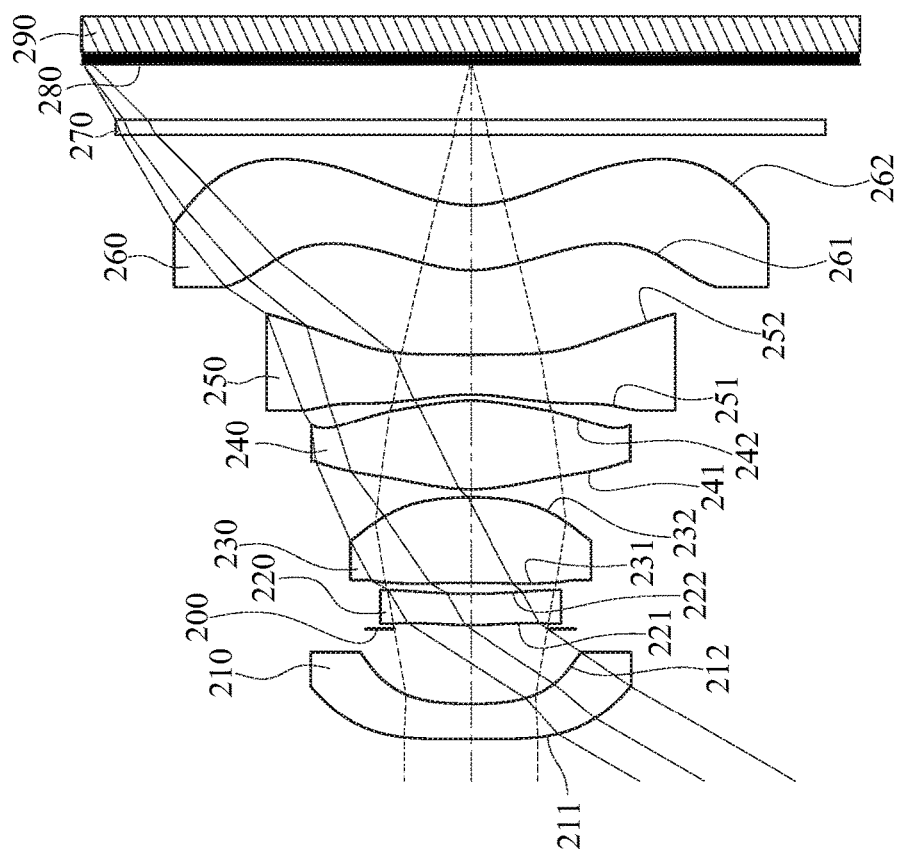
FIG. 3 is a schematic view of an image capturing unit according to the 2nd embodiment of the present disclosure.
Figure 4:
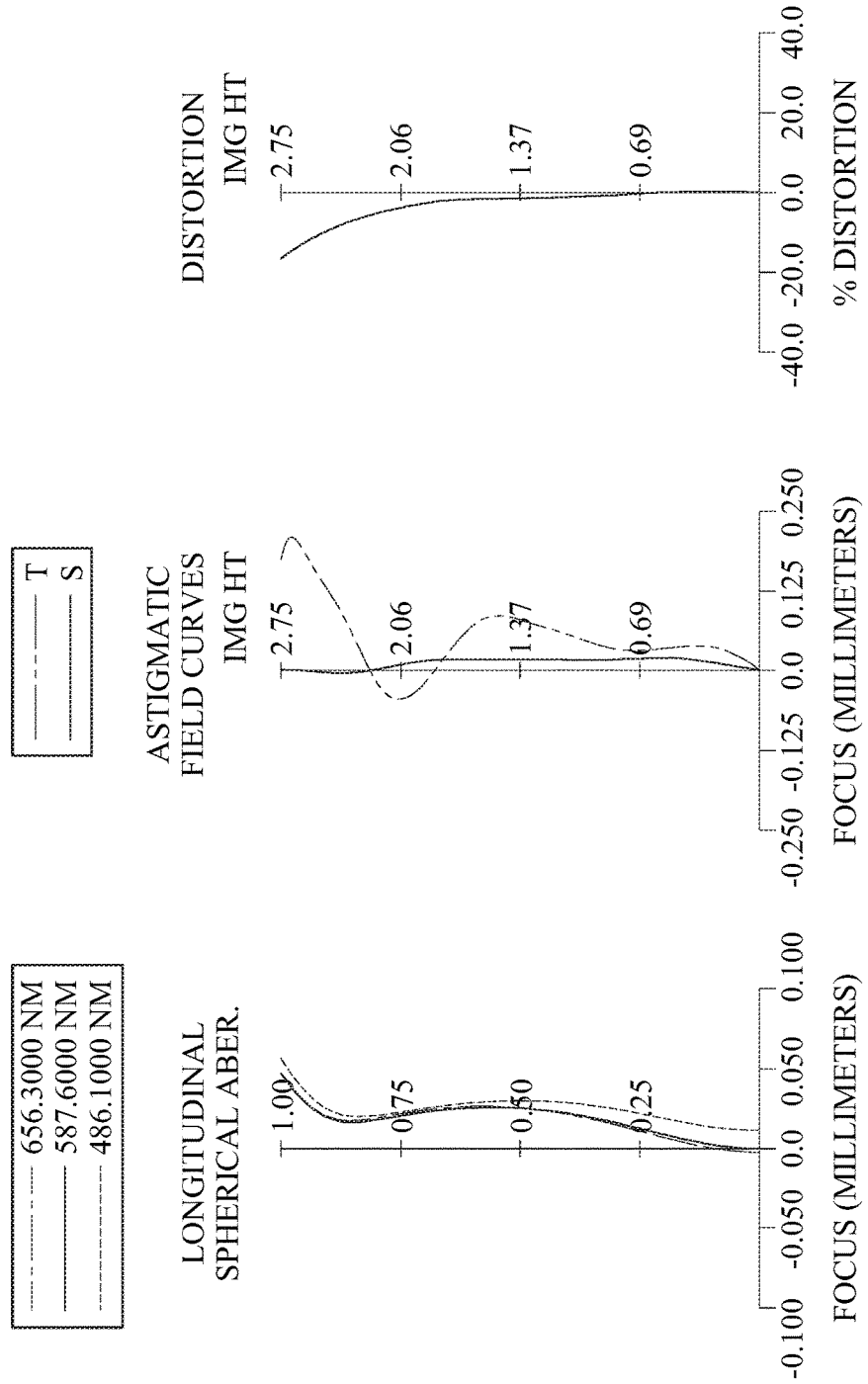
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens system (its reference numeral is omitted) of the present disclosure and an image sensor 290. The imaging lens system includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the imaging lens system has a total of six single and non-cemented lens elements (210-260).

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one convex shape in an off-axial region thereof.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one inflection point in an off-axial region thereof.

The IR-cut filter 270 is made of glass material and located between the sixth lens element 260 and the image surface 280, and will not affect the focal length of the imaging lens system. The image sensor 290 is disposed on or near the image surface 280 of the imaging lens system.

The detailed optical data of the 2nd embodiment are shown in Table 3 and the aspheric surface data are shown in Table 4 below.

TABLE 3

2nd Embodiment
f = 1.91 mm, Fno = 2.02, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.860 | (ASP) | 0.250 | Plastic | 1.545 | 56.0 | −4.02 |
| 2 | | 3.069 | (ASP) | 0.532 | | | | |
| 3 | Ape. Stop | Plano | | 0.028 | | | | |
| 4 | Lens 2 | 4.147 | (ASP) | 0.220 | Plastic | 1.660 | 20.4 | 25.61 |
| 5 | | 5.380 | (ASP) | 0.078 | | | | |
| 6 | Lens 3 | −6.560 | (ASP) | 0.606 | Plastic | 1.544 | 55.9 | 7.12 |
| 7 | | −2.513 | (ASP) | 0.056 | | | | |
| 8 | Lens 4 | 1.435 | (ASP) | 0.634 | Plastic | 1.544 | 55.9 | 1.29 |
| 9 | | −1.153 | (ASP) | 0.043 | | | | |
| 10 | Lens 5 | −1.386 | (ASP) | 0.280 | Plastic | 1.660 | 20.4 | −1.81 |
| 11 | | 9.156 | (ASP) | 0.600 | | | | |
| 12 | Lens 6 | 1.032 | (ASP) | 0.460 | Plastic | 1.639 | 23.3 | 23.69 |
| 13 | | 0.915 | (ASP) | 0.500 | | | | |
| 14 | IR-cut filter | Plano | | 0.110 | Glass | 1.517 | 64.2 | — |
| 15 | | Plano | | 0.393 | | | | |
| 16 | Image | Plano | | — | | | | |

Note:
Reference wavelength is 587.6 nm (d-line).
An effective radius of the image-side surface 242 (Surface 9) is 1.130 mm.

TABLE 4

Aspheric Coefficients

| | Surface # | | | | | |
|---|---|---|---|---|---|---|
| | 1 | 2 | 3 | 4 | 6 | 7 |
| k = | −2.5002E+01 | −9.0000E+01 | −1.9357E+01 | −8.6745E+01 | −3.8990E+01 | 3.6226E+00 |
| A4 = | 5.9095E−01 | 1.1399E+00 | −6.1924E−02 | 3.0155E−01 | 4.2508E−01 | −4.5190E−01 |
| A6 = | −8.3401E−01 | −1.4409E+00 | −7.1147E−01 | −1.6376E+00 | −1.6928E+00 | −2.9732E−01 |
| A8 = | 1.1426E+00 | 1.7836E+00 | −5.5100E−01 | 4.0411E+00 | 5.7165E+00 | 2.4331E+00 |
| A10 = | −1.0011E+00 | 6.0946E−01 | 5.3206E+00 | −5.8831E+00 | −1.0231E+01 | −4.2951E+00 |

TABLE 4-continued

Aspheric Coefficients

| A12 = | 5.0875E−01 | −1.9000E−01 | −1.1716E+01 | 3.0536E+00 | 9.1882E+00 | 3.3234E+00 |
| A14 = | −1.1424E−01 | −2.3161E+00 | — | — | −3.2319E+00 | −7.6847E−01 |

| | Surface # | | | | | |
|---|---|---|---|---|---|---|
| | 8 | 9 | 10 | 11 | 12 | 13 |
| k = | −1.3199E+01 | −1.1539E+01 | −1.7173E+01 | −3.1796E+01 | −5.2895E+00 | −2.6328E+00 |
| A4 = | 1.6397E−01 | 7.4268E−01 | 3.9511E−01 | −2.4793E−01 | −3.4436E−02 | −1.9428E−01 |
| A6 = | −1.1404E+00 | −2.6258E+00 | −7.6514E−01 | 1.4095E+00 | −2.5460E−01 | 1.0286E−01 |
| A8 = | 2.1357E+00 | 3.2719E+00 | 8.5513E−01 | −2.1467E+00 | 3.5281E−01 | −3.4919E−02 |
| A10 = | −1.7618E+00 | −5.0351E−01 | 7.8006E−02 | 1.6195E+00 | −2.5459E−01 | 4.9887E−03 |
| A12 = | 5.5946E−01 | −2.5455E+00 | −1.2208E+00 | −6.7097E−01 | 9.8796E−02 | 2.3982E−04 |
| A14 = | 8.9574E−02 | 2.2895E+00 | 1.0088E+00 | 1.4668E−01 | −1.9118E−02 | −1.6264E−04 |
| A16 = | −7.4892E−02 | −6.0729E−01 | −2.5154E−01 | −1.3297E−02 | 1.4505E−03 | 1.4348E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.91 | TL/[f*tan(HFOV)] | 1.45 |
| f/EPD | 2.02 | (R1 + R2)/(R1 − R2) | 0.44 |
| HFOV [deg.] | 60.0 | (R5 + R6)/(R5 − R6) | 2.24 |
| FOV [deg.] | 120.0 | (R9 + R10)/(R9 − R10) | −0.74 |
| (V5 + V6)/V4 | 0.78 | |R11 − R12|/(R11 + R12)| | 0.06 |
| CTmax/T56 | 1.06 | R12/f | 0.48 |
| T56/CT6 | 1.30 | |f/R3| + |f/R4| | 0.82 |
| ΣAT/(T23 + T34 + T45) | 7.55 | (|Sag21| + |Sag22|)/CT2 | 0.16 |
| ΣAT/T56 | 2.23 | |SD11/SD62| | 0.54 |
| TL/ImgH | 1.74 | The quantity of the lens elements with Abbe # smaller than 30 | 3 |

3rd Embodiment

Figure 5:
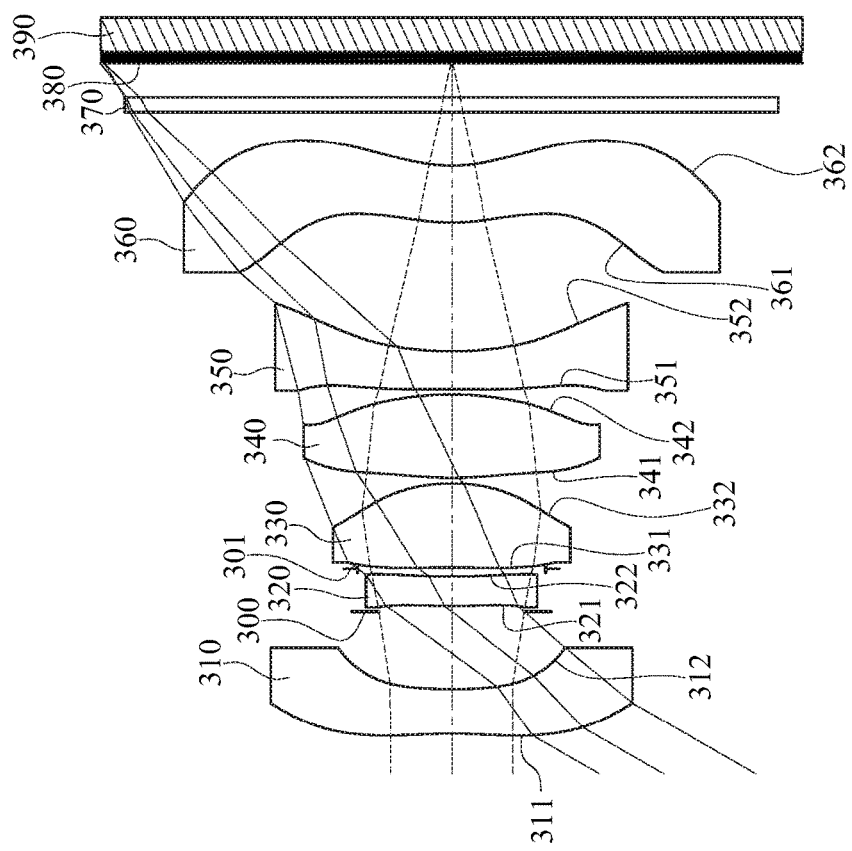
FIG. 5 is a schematic view of an image capturing unit according to the 3rd embodiment of the present disclosure.
Figure 6:
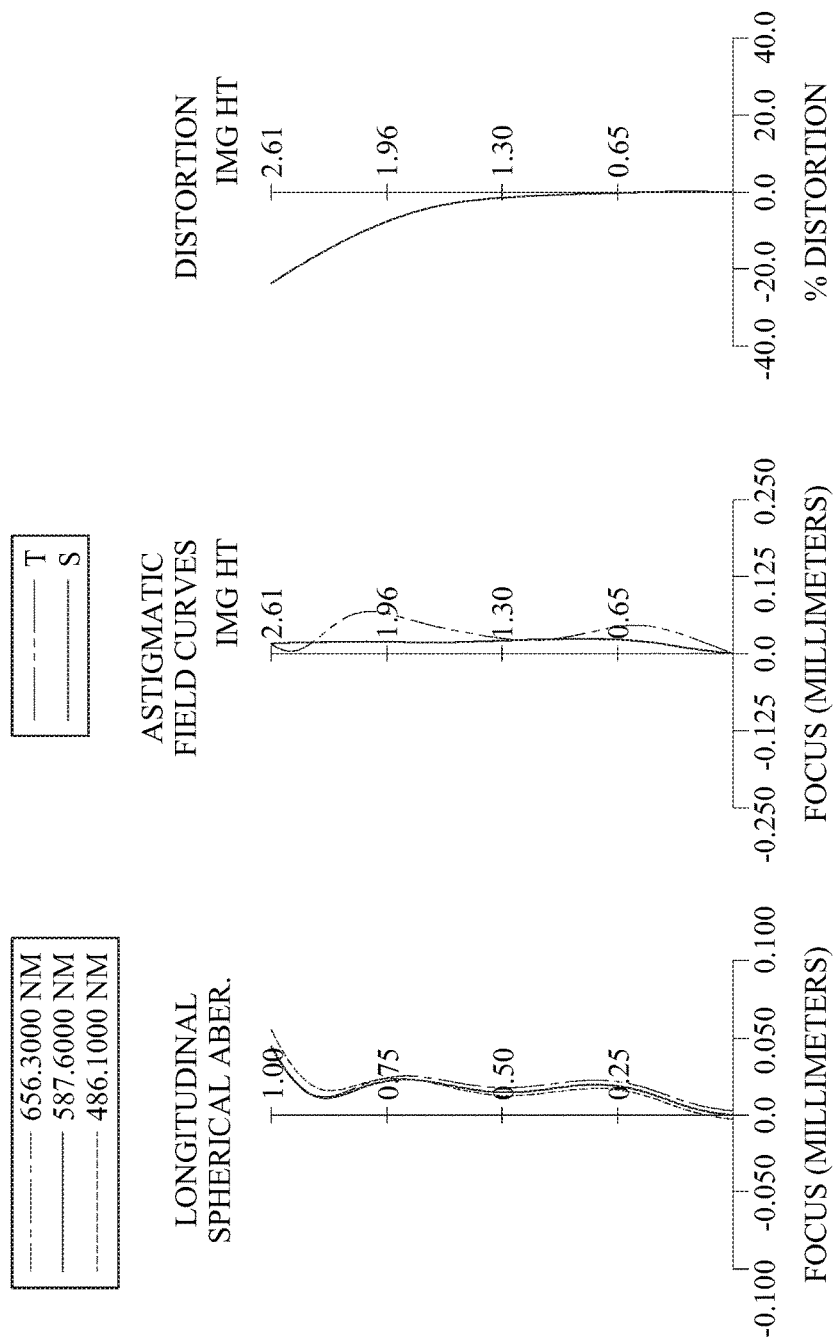
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens system (its reference numeral is omitted) of the present disclosure and an image sensor 390. The imaging lens system includes, in order from an object side to an image side, a first lens element 310, an aperture stop 300, a second lens element 320, a stop 301, a third lens element 330, a fourth lens element 340, a fifth lens element 350, a sixth lens element 360, an IR-cut filter 370 and an image surface 380, wherein the imaging lens system has a total of six single and non-cemented lens elements (310-360). The stop 301 can be a glare stop or a field stop.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one convex shape in an off-axial region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one inflection point in an off-axial region thereof.

The IR-cut filter 370 is made of glass material and located between the sixth lens element 360 and the image surface 380, and will not affect the focal length of the imaging lens system. The image sensor 390 is disposed on or near the image surface 380 of the imaging lens system.

The detailed optical data of the 3rd embodiment are shown in Table 5 and the aspheric surface data are shown in Table 6 below.

TABLE 5

3rd Embodiment
f = 2.00 mm, Fno = 2.20, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.508 | (ASP) | 0.333 | Plastic | 1.545 | 56.0 | −3.94 |
| 2 | | 5.720 | (ASP) | 0.576 | | | | |
| 3 | Ape. Stop | Plano | | 0.042 | | | | |
| 4 | Lens 2 | 6.427 | (ASP) | 0.220 | Plastic | 1.660 | 20.4 | −597.79 |
| 5 | | 6.238 | (ASP) | 0.057 | | | | |
| 6 | Stop | Plano | | 0.009 | | | | |
| 7 | Lens 3 | −9.608 | (ASP) | 0.625 | Plastic | 1.544 | 55.9 | 3.22 |
| 8 | | −1.514 | (ASP) | 0.040 | | | | |
| 9 | Lens 4 | 2.193 | (ASP) | 0.625 | Plastic | 1.544 | 55.9 | 2.11 |
| 10 | | −2.164 | (ASP) | 0.040 | | | | |
| 11 | Lens 5 | −13.001 | (ASP) | 0.280 | Plastic | 1.660 | 20.4 | −3.44 |
| 12 | | 2.774 | (ASP) | 0.958 | | | | |
| 13 | Lens 6 | 1.708 | (ASP) | 0.422 | Plastic | 1.660 | 20.4 | −8.94 |
| 14 | | 1.195 | (ASP) | 0.400 | | | | |
| 15 | IR-cut filter | Plano | | 0.110 | Glass | 1.517 | 64.2 | — |
| 16 | | Plano | | 0.254 | | | | |
| 17 | Image | Plano | | — | | | | |

Note:
Reference wavelength is 587.6 nm (d-line).
An effective radius of the stop 301 (surface 6) is 0.700 mm.

TABLE 6

Aspheric Coefficients

| Surface # | 1 | 2 | 3 | 4 | 6 | 7 |
|---|---|---|---|---|---|---|
| k = | −4.0574E−01 | −8.9282E+01 | −8.6434E+01 | −8.7560E+01 | −4.5169E+01 | 1.0347E+00 |
| A4 = | 4.0776E−01 | 5.9596E−01 | −1.3243E−01 | 1.4063E−01 | 2.9011E−01 | −7.2868E−01 |
| A6 = | −4.1109E−01 | −1.7902E−01 | −7.9320E−01 | −1.1210E+00 | −9.7392E−01 | 2.7874E+00 |
| A8 = | 3.3563E−01 | −5.7295E−01 | 3.6986E−01 | 2.7391E+00 | 4.1230E+00 | −6.5767E+00 |
| A10 = | −1.7453E−01 | 1.5846E+00 | 1.3280E+00 | −4.1938E+00 | −8.4044E+00 | 9.8267E+00 |
| A12 = | 5.0728E−02 | −7.1183E−01 | −4.3280E+00 | 2.3243E+00 | 8.1414E+00 | −7.3723E+00 |
| A14 = | −6.2727E−03 | −2.6801E−01 | — | — | −3.0700E+00 | 2.1751E+00 |

| Surface # | 8 | 9 | 10 | 11 | 12 | 13 |
|---|---|---|---|---|---|---|
| k = | −6.1691E+01 | −6.5033E+00 | 4.9353E+01 | −2.4755E+01 | −1.4311E+01 | −3.3473E+00 |
| A4 = | −1.8270E−01 | 2.8814E−01 | 3.5625E−01 | 1.2113E−01 | −6.2739E−02 | −2.0223E−01 |
| A6 = | 4.2865E−01 | −1.7160E+00 | −7.9593E−01 | 3.6854E−01 | −3.5030E−01 | 8.6838E−02 |
| A8 = | −7.5669E−01 | 3.8264E+00 | 1.4474E+00 | −9.1632E−01 | 4.9272E−01 | −1.4890E−02 |
| A10 = | 1.1783E+00 | −4.9394E+00 | −1.9802E+00 | 8.7585E−01 | −3.7131E−01 | −5.9662E−03 |
| A12 = | −1.0643E+00 | 3.7112E+00 | 1.5754E+00 | −4.3868E−01 | 1.5996E−01 | 3.5229E−03 |
| A14 = | 5.1154E−01 | −1.3961E+00 | −6.4405E−01 | 1.1374E−01 | −3.5415E−02 | −6.8506E−04 |
| A16 = | −1.0583E−01 | 1.9113E−01 | 1.0365E−01 | −1.2052E−02 | 3.1103E−03 | 4.9148E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.00 | TL/[f*tan(HFOV)] | 1.44 |
| f/EPD | 2.20 | (R1 + R2)/(R1 − R2) | −0.24 |
| HFOV [deg.] | 60.0 | (R5 + R6)/(R5 − R6) | 1.37 |
| FOV [deg.] | 120.0 | (R9 + R10)/(R9 − R10) | 0.65 |
| (V5 + V6)/V4 | 0.73 | |R11 − R12|/(R11 + R12)| | 0.18 |
| CTmax/T56 | 0.65 | R12/f | 0.60 |
| T56/CT6 | 2.27 | |f/R3| + |f/R4| | 0.63 |
| ΣAT/(T23 + T34 + T45) | 11.79 | (|Sag21| + |Sag22|)/CT2 | 0.11 |
| ΣAT/T56 | 1.80 | |SD11/SD62| | 0.67 |
| TL/ImgH | 1.91 | The quantity of the lens elements with Abbe # smaller than 30 | 3 |

4th Embodiment

Figure 7:
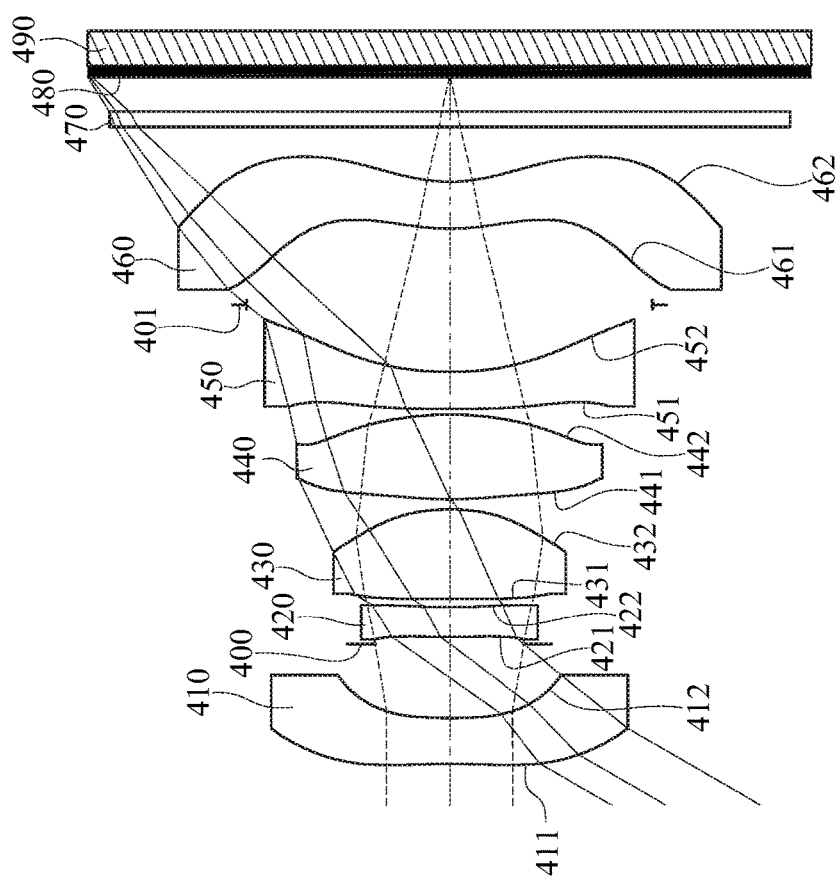
FIG. 7 is a schematic view of an image capturing unit according to the 4th embodiment of the present disclosure.
Figure 8:
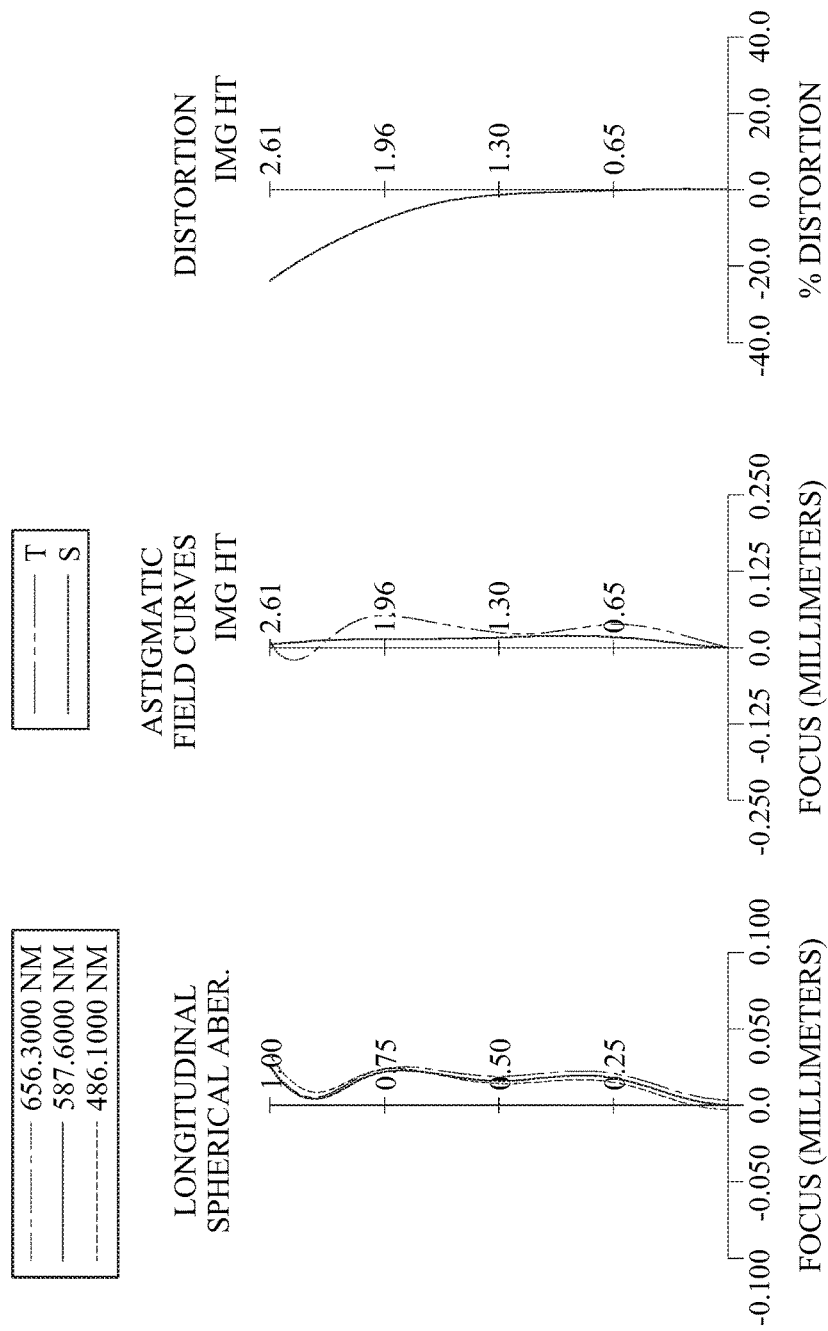
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens system (its reference numeral is omitted) of the present disclosure and an image sensor 490. The imaging lens system includes, in order from an object side to an image side, a first lens element 410, an aperture stop 400, a second lens element 420, a third lens element 430, a fourth lens element 440, a fifth lens element 450, a stop 401, a sixth lens element 460, an IR-cut filter 470 and an image surface 480, wherein the imaging lens system has a total of six single and non-cemented lens elements (410-460). The stop 401 can be a glare stop or a field stop.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one convex shape in an off-axial region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one inflection point in an off-axial region thereof.

The IR-cut filter 470 is made of glass material and located between the sixth lens element 460 and the image surface 480, and will not affect the focal length of the imaging lens system. The image sensor 490 is disposed on or near the image surface 480 of the imaging lens system.

The detailed optical data of the 4th embodiment are shown in Table 7 and the aspheric surface data are shown in Table 8 below.

TABLE 7

4th Embodiment
f = 2.02 mm, Fno = 2.20, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.304 | (ASP) | 0.331 | Plastic | 1.545 | 56.0 | −3.85 |
| 2 | | 4.196 | (ASP) | 0.538 | | | | |
| 3 | Ape. Stop | Plano | | 0.051 | | | | |
| 4 | Lens 2 | 10.817 | (ASP) | 0.220 | Plastic | 1.660 | 20.4 | −33.33 |
| 5 | | 7.192 | (ASP) | 0.060 | | | | |
| 6 | Lens 3 | −16.751 | (ASP) | 0.648 | Plastic | 1.544 | 55.9 | 3.07 |
| 7 | | −1.540 | (ASP) | 0.071 | | | | |
| 8 | Lens 4 | 2.240 | (ASP) | 0.616 | Plastic | 1.544 | 55.9 | 2.18 |
| 9 | | −2.265 | (ASP) | 0.040 | | | | |
| 10 | Lens 5 | 112.103 | (ASP) | 0.270 | Plastic | 1.660 | 20.4 | −4.02 |
| 11 | | 2.588 | (ASP) | 0.490 | | | | |
| 12 | Stop | Plano | | 0.550 | | | | |
| 13 | Lens 6 | 1.594 | (ASP) | 0.339 | Plastic | 1.660 | 20.4 | −7.22 |
| 14 | | 1.094 | (ASP) | 0.400 | | | | |
| 15 | IR-cut filter | Plano | | 0.110 | Glass | 1.517 | 64.2 | — |
| 16 | | Plano | | 0.250 | | | | |
| 17 | Image | Plano | | — | | | | |

Note:
Reference wavelength is 587.6 nm (d-line).
An effective radius of the stop 401 (surface 12) is 1.470 mm.

TABLE 8

Aspheric Coefficients

| Surface # | | | | | |
|---|---|---|---|---|---|
| 1 | 2 | 3 | 4 | 6 | 7 |
| k = −2.0436E+00 | −5.5883E+01 | −3.9645E+01 | −3.7942E+01 | 4.9350E+01 | 1.1023E+00 |
| A4 = 4.1525E−01 | 6.9318E−01 | −1.7557E−01 | 1.1697E−01 | 2.6809E−01 | −6.4061E−01 |
| A6 = −4.4639E−01 | −4.1983E−01 | −5.5703E−01 | −9.1257E−01 | −6.3673E−01 | 2.1758E+00 |
| A8 = 4.0452E−01 | 8.0211E−02 | −8.1916E−01 | 1.9284E+00 | 2.4856E+00 | −4.4176E+00 |
| A10 = −2.3629E−01 | 7.7735E−01 | 4.9964E+00 | −2.7538E+00 | −5.1216E+00 | 5.6420E+00 |
| A12 = 7.7302E−02 | 1.7165E−01 | −8.9261E+00 | 1.3845E+00 | 5.0915E+00 | −3.5218E+00 |
| A14 = −1.0717E−02 | −9.2272E−01 | — | — | −1.9698E+00 | 8.5517E−01 |

| Surface # | | | | | |
|---|---|---|---|---|---|
| 8 | 9 | 10 | 11 | 12 | 13 |
| k = −5.5484E+01 | −6.2778E+00 | −9.0000E+01 | −2.9934E+01 | −1.2410E+01 | −1.6639E+00 |
| A4 = −1.9381E−01 | 1.1801E−01 | 2.9626E−01 | 2.7423E−01 | −9.8718E−02 | −3.9531E−01 |
| A6 = 3.6203E−01 | −9.3706E−01 | −6.2197E−01 | −1.0265E−01 | −3.7572E−01 | 2.6511E−01 |
| A8 = −1.1857E−01 | 2.0096E+00 | 9.7444E−01 | −2.0557E−01 | 6.1237E−01 | −1.2451E−01 |
| A10 = −3.5475E−01 | −2.1183E+00 | −1.1611E+00 | 2.6154E−01 | −5.1773E−01 | 3.6638E−02 |
| A12 = 5.7657E−01 | 9.7065E−01 | 7.7209E−01 | −1.2747E−01 | 2.4315E−01 | −6.6106E−03 |
| A14 = −3.2406E−01 | 3.3247E−02 | −2.3963E−01 | 2.7603E−02 | −5.7827E−02 | 6.7129E−04 |
| A16 = 6.1074E−02 | −1.0858E−01 | 2.3355E−02 | −1.9943E−03 | 5.4267E−03 | −2.8735E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.02 | TL/[f*tan(HFOV)] | 1.42 |
| f/EPD | 2.20 | (R1 + R2)/(R1 − R2) | 0.01 |
| HFOV [deg.] | 60.0 | (R5 + R6)/(R5 − R6) | 1.20 |
| FOV [deg.] | 120.0 | (R9 + R10)/(R9 − R10) | 1.05 |
| (V5 + V6)/V4 | 0.73 | |R11 − R12|/(R11 + R12)| | 0.19 |
| CTmax/T56 | 0.62 | R12/f | 0.54 |
| T56/CT6 | 3.07 | |f/R3| + |f/R4| | 0.47 |
| ΣAT/(T23 + T34 + T45) | 10.53 | (|Sag21| + |Sag22|)/CT2 | 0.14 |
| ΣAT/T56 | 1.73 | |SD11/SD62| | 0.66 |
| TL/ImgH | 1.91 | The quantity of the lens elements with Abbe # smaller than 30 | 3 |

5th Embodiment

Figure 9:
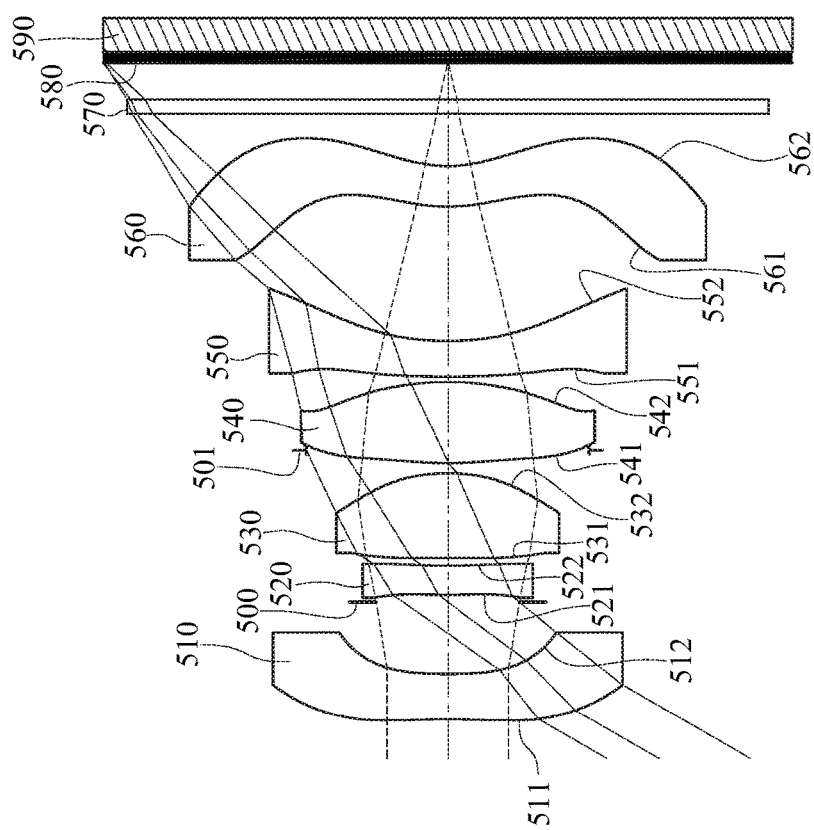
FIG. 9 is a schematic view of an image capturing unit according to the 5th embodiment of the present disclosure.
Figure 10:
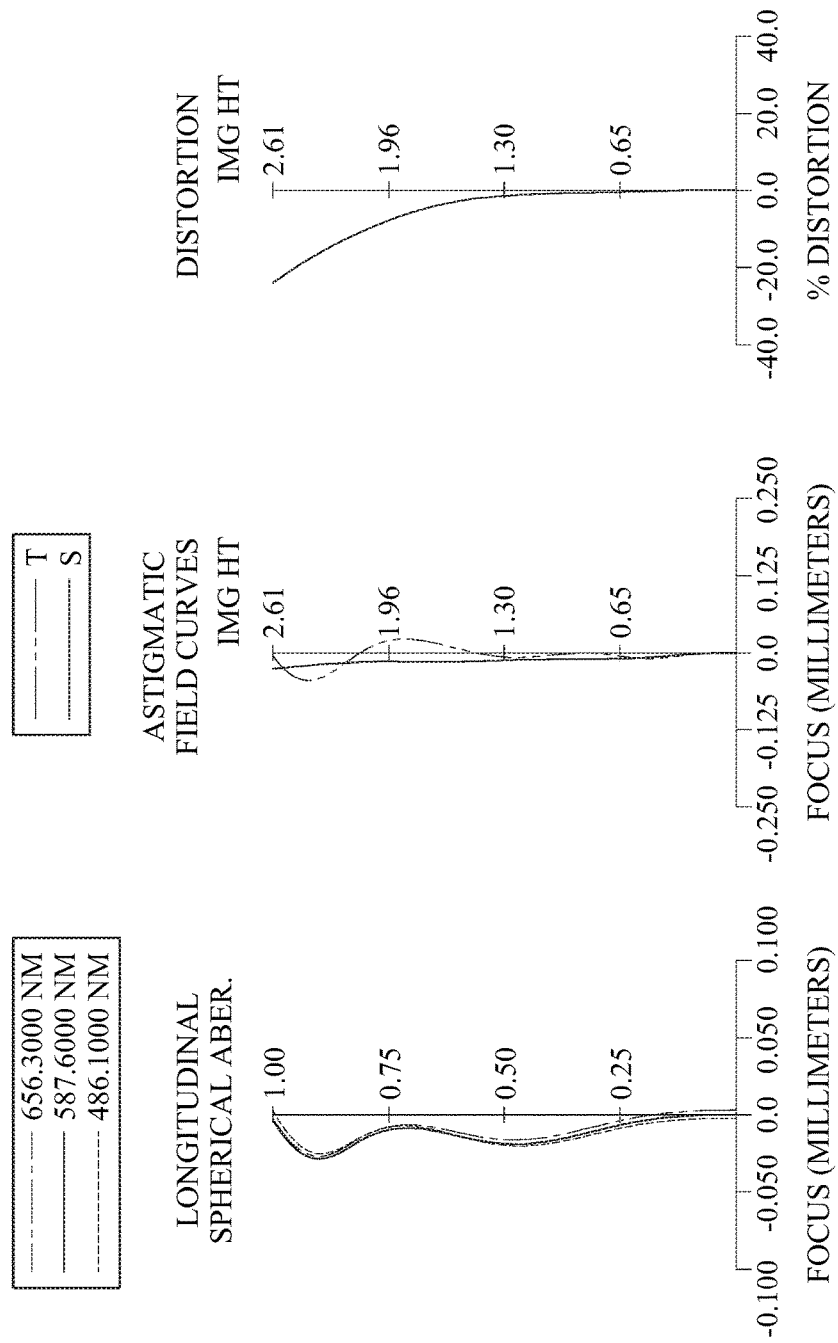
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens system (its reference numeral is omitted) of the present disclosure and an image sensor 590. The imaging lens system includes, in order from an object side to an image side, a first lens element 510, an aperture stop 500, a second lens element 520, a third lens element 530, a stop 501, a fourth lens element 540, a fifth lens element 550, a sixth lens element 560, an IR-cut filter 570 and an image surface 580, wherein the imaging lens system has a total of six single and non-cemented lens elements (510-560). The stop 501 can be a glare stop or a field stop.

The first lens element 510 with negative refractive power has an object-side surface being 511 concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one convex shape in an off-axial region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one inflection point in an off-axial region thereof.

The IR-cut filter 570 is made of glass material and located between the sixth lens element 560 and the image surface 580, and will not affect the focal length of the imaging lens system. The image sensor 590 is disposed on or near the image surface 580 of the imaging lens system.

The detailed optical data of the 5th embodiment are shown in Table 9 and the aspheric surface data are shown in Table 10 below.

TABLE 9

5th Embodiment
f = 2.03 mm, Fno = 2.19, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.068 | (ASP) | 0.345 | Plastic | 1.545 | 56.0 | −3.94 |
| 2 | | 4.687 | (ASP) | 0.544 | | | | |
| 3 | Ape. Stop | Plano | | 0.055 | | | | |
| 4 | Lens 2 | 15.044 | (ASP) | 0.220 | Plastic | 1.660 | 20.4 | −24.60 |
| 5 | | 7.763 | (ASP) | 0.057 | | | | |
| 6 | Lens 3 | −24.423 | (ASP) | 0.642 | Plastic | 1.544 | 55.9 | 3.03 |
| 7 | | −1.559 | (ASP) | 0.173 | | | | |
| 8 | Stop | Plano | | −0.098 | | | | |
| 9 | Lens 4 | 2.420 | (ASP) | 0.620 | Plastic | 1.544 | 55.9 | 2.19 |
| 10 | | −2.132 | (ASP) | 0.040 | | | | |
| 11 | Lens 5 | 19.087 | (ASP) | 0.270 | Plastic | 1.660 | 20.4 | −3.97 |
| 12 | | 2.291 | (ASP) | 1.015 | | | | |
| 13 | Lens 6 | 1.346 | (ASP) | 0.305 | Plastic | 1.660 | 20.4 | −8.31 |
| 14 | | 0.983 | (ASP) | 0.400 | | | | |
| 15 | IR-cut filter | Plano | | 0.110 | Glass | 1.517 | 64.2 | — |
| 16 | | Plano | | 0.276 | | | | |
| 17 | Image | Plano | | — | | | | |

Note:
Reference wavelength is 587.6 nm (d-line).
An effective radius of the stop 501 (surface 8) is 1.070 mm.

TABLE 10

Aspheric Coefficients

| Surface # | | | | | |
|---|---|---|---|---|---|
| 1 | 2 | 3 | 4 | 6 | 7 |

| | 1 | 2 | 3 | 4 | 6 | 7 |
|---|---|---|---|---|---|---|
| k = | −1.2014E+00 | 0.0000E+00 | 1.9618E+01 | −4.0150E+01 | 9.0000E+01 | 1.0626E+00 |
| A4 = | 4.0116E−01 | 5.5692E−01 | −1.6173E−01 | 1.5479E−01 | 3.1959E−01 | −5.9918E−01 |
| A6 = | −4.1372E−01 | −6.5964E−02 | −6.9652E−01 | −1.1287E+00 | −9.3226E−01 | 2.0342E+00 |
| A8 = | 3.6299E−01 | −1.0867E+00 | −1.9525E−01 | 2.1580E+00 | 2.8148E+00 | −4.1781E+00 |
| A10 = | −2.0452E−01 | 3.4374E+00 | 3.7504E+00 | −2.3847E+00 | −4.7001E+00 | 5.4786E+00 |
| A12 = | 6.4150E−02 | −3.3564E+00 | −7.4824E+00 | 8.8646E−01 | 4.0204E+00 | −3.5338E+00 |
| A14 = | −8.4862E−03 | 1.2061E+00 | — | — | −1.4081E+00 | 8.6369E−01 |
| A16 = | — | −2.9676E−01 | — | — | — | — |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | −4.9106E+01 | −6.2312E+00 | −9.0000E+01 | −3.0390E+01 | −8.3199E+00 | −1.4647E+00 |
| A4 = | −2.6939E−01 | 8.1478E−02 | 2.5402E−01 | 3.2529E−01 | −8.7581E−02 | −4.3043E−01 |
| A6 = | 6.7560E−01 | −7.5082E−01 | −4.4692E−01 | −2.2707E−01 | −3.9205E−01 | 2.7406E−01 |
| A8 = | −9.2541E−01 | 1.5075E+00 | 4.7873E−01 | −7.4594E−02 | 5.9299E−01 | −1.2020E−01 |
| A10 = | 9.6478E−01 | −1.3649E+00 | −4.1867E−01 | 1.9340E−01 | −4.6647E−01 | 3.2357E−02 |
| A12 = | −6.8100E−01 | 3.5194E−01 | 1.7407E−01 | −1.1531E−01 | 2.0507E−01 | −5.0814E−03 |
| A14 = | 3.1304E−01 | 3.0569E−01 | 5.5464E−03 | 3.0745E−02 | −4.5961E−02 | 4.0034E−04 |
| A16 = | −7.2632E−02 | −1.6143E−01 | −1.6399E−02 | −3.1789E−03 | 4.0820E−03 | −9.6266E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.03 | TL/[f*tan(HFOV)] | 1.42 |
| f/EPD | 2.19 | (R1 + R2)/(R1 − R2) | −0.07 |
| HFOV [deg.] | 59.9 | (R5 + R6)/(R5 − R6) | 1.14 |
| FOV [deg.] | 119.8 | (R9 + R10)/(R9 − R10) | 1.27 |
| (V5 + V6)/V4 | 0.73 | |R11 − R12|/(R11 + R12)| | 0.16 |
| CTmax/T56 | 0.63 | R12/f | 0.48 |
| T56/CT6 | 3.33 | |f/R3| + |f/R4| | 0.40 |
| ΣAT/(T23 + T34 + T45) | 10.38 | (|Sag21| + |Sag22|)/CT2 | 0.15 |
| ΣAT/T56 | 1.76 | |SD11/SD62| | 0.68 |
| TL/ImgH | 1.91 | The quantity of the lens elements with Abbe # smaller than 30 | 3 |

6th Embodiment

Figure 11:
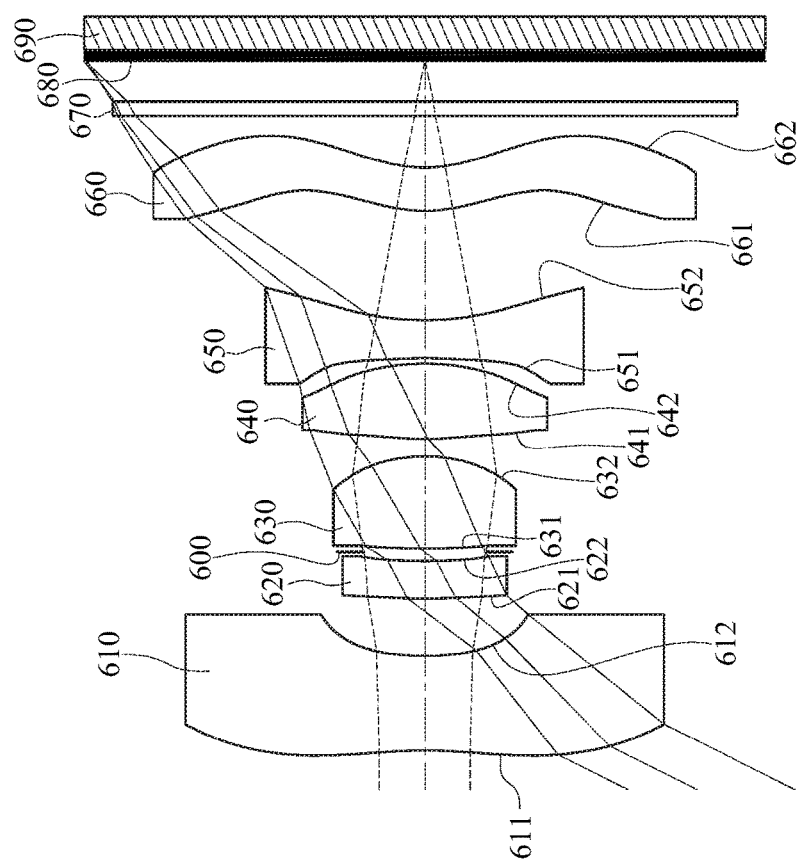
FIG. 11 is a schematic view of an image capturing unit according to the 6th embodiment of the present disclosure.
Figure 12:
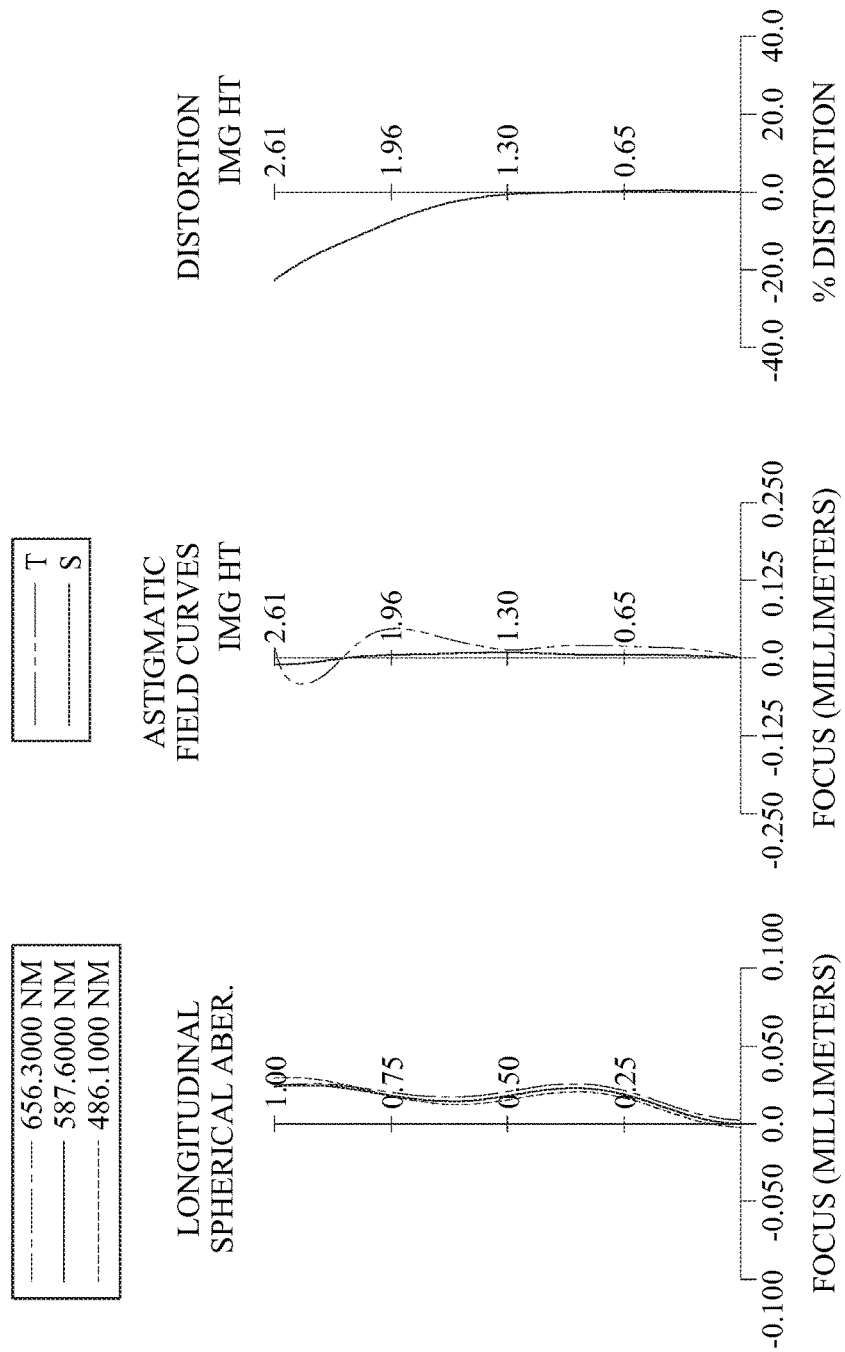
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens system (its reference numeral is omitted) of the present disclosure and an image sensor 690. The imaging lens system includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the imaging lens system has a total of six single and non-cemented lens elements (610-660).

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one convex shape in an off-axial region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one inflection point in an off-axial region thereof.

The IR-cut filter 670 is made of glass material and located between the sixth lens element 660 and the image surface 680, and will not affect the focal length of the imaging lens system. The image sensor 690 is disposed on or near the image surface 680 of the imaging lens system.

The detailed optical data of the 6th embodiment are shown in Table 11 and the aspheric surface data are shown in Table 12 below.

TABLE 11

6th Embodiment
f = 1.71 mm, Fno = 2.45, HFOV = 63.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.609 | (ASP) | 0.729 | Plastic | 1.545 | 56.0 | −2.50 |
| 2 | | 2.342 | (ASP) | 0.439 | | | | |
| 3 | Lens 2 | 5.388 | (ASP) | 0.286 | Plastic | 1.671 | 19.5 | −64.19 |
| 4 | | 4.687 | (ASP) | 0.069 | | | | |
| 5 | Ape. Stop | Plano | | 0.027 | | | | |
| 6 | Lens 3 | 6.208 | (ASP) | 0.705 | Plastic | 1.544 | 55.9 | 2.34 |
| 7 | | −1.539 | (ASP) | 0.137 | | | | |
| 8 | Lens 4 | 2.075 | (ASP) | 0.578 | Plastic | 1.544 | 55.9 | 1.82 |
| 9 | | −1.699 | (ASP) | 0.040 | | | | |
| 10 | Lens 5 | −4.523 | (ASP) | 0.291 | Plastic | 1.639 | 23.5 | −2.29 |
| 11 | | 2.216 | (ASP) | 0.838 | | | | |

TABLE 11-continued

6th Embodiment
f = 1.71 mm, Fno = 2.45, HFOV = 63.3 deg.

| Surface # | | Curvature Radius | | Thickness | Material | Index | Abbe # | Focal Length |
|---|---|---|---|---|---|---|---|---|
| 12 | Lens 6 | 1.183 | (ASP) | 0.331 | Plastic | 1.671 | 19.5 | 58.78 |
| 13 | | 1.082 | (ASP) | 0.400 | | | | |
| 14 | IR-cut filter | Plano | | 0.110 | Glass | 1.517 | 64.2 | — |
| 15 | | Plano | | 0.310 | | | | |
| 16 | Image | Plano | | — | | | | |

Note:
Reference wavelength is 587.6 nm (d-line).
An effective radius of the image-side surface 632 (surface 7) is 0.700 mm.

TABLE 12

Aspheric Coefficients

| Surface # | | | | | |
|---|---|---|---|---|---|
| 1 | 2 | 3 | 4 | 6 | 7 |
| k = 1.1942E+00 | −8.9519E+01 | −3.6365E+01 | −6.6302E+01 | 9.0000E+01 | 1.7805E+00 |
| A4 = 1.7584E−01 | 9.2665E−01 | −1.0422E−01 | 2.9357E−02 | −2.4975E−01 | −6.9738E−01 |
| A6 = −9.5081E−02 | −2.3953E+00 | 8.1830E−02 | 7.0083E−01 | 2.0595E+00 | 1.7454E+00 |
| A8 = 4.0352E−02 | 8.4400E+00 | 1.9484E+00 | 4.5873E+00 | −1.3920E+01 | −1.7789E+00 |
| A10 = −1.0212E−02 | −2.0164E+01 | −6.7716E+00 | −2.0770E+01 | 7.9529E+01 | −1.3050E+00 |
| A12 = 1.3538E−03 | 2.8857E+01 | 4.6116E+00 | 2.2509E+01 | −2.4867E+02 | 5.1017E+00 |
| A14 = −6.7979E−05 | −1.6512E+01 | — | — | 2.9129E+02 | −4.5167E+00 |

| Surface # | | | | | |
|---|---|---|---|---|---|
| 8 | 9 | 10 | 11 | 12 | 13 |
| k = −5.6603E+01 | −3.7942E+00 | 1.7935E+01 | −2.3742E+01 | −6.4888E+00 | −2.3597E+00 |
| A4 = −1.4643E−01 | 7.8062E−02 | 2.3613E−01 | 1.7140E−01 | 3.1267E−02 | −1.6403E−01 |
| A6 = −8.2396E−01 | −1.3576E+00 | −4.3074E−01 | 2.3584E−01 | −3.3960E−01 | −8.0552E−03 |
| A8 = 5.7298E+00 | 4.7329E+00 | 3.0192E−01 | −1.2717E+00 | 2.9470E−01 | 5.8058E−02 |
| A10 = −1.3446E+01 | −9.0823E+00 | −2.1373E−01 | 1.8107E+00 | −1.2250E−01 | −3.4883E−02 |
| A12 = 1.5763E+01 | 9.2116E+00 | −1.7423E+00 | −1.2813E+00 | 2.8884E−02 | 1.0069E−02 |
| A14 = −8.7088E+00 | −4.0327E+00 | 3.2296E+00 | 4.6639E−01 | −3.7904E−03 | −1.4463E−03 |
| A16 = 1.4920E+00 | 4.1221E−01 | −1.4276E+00 | −6.9967E−02 | 2.1740E−04 | 8.1886E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.71 | TL/[f*tan(HFOV)] | 1.56 |
| f/EPD | 2.45 | (R1 + R2)/(R1 − R2) | 0.21 |
| HFOV [deg.] | 63.3 | (R5 + R6)/(R5 − R6) | 0.60 |
| FOV [deg.] | 126.6 | (R9 + R10)/(R9 − R10) | 0.34 |
| (V5 + V6)/V4 | 0.77 | |R11 − R12|/(R11 + R12)| | 0.04 |
| CTmax/T56 | 0.87 | R12/f | 0.63 |
| T56/CT6 | 2.53 | |f/R3| + |f/R4| | 0.68 |
| ΣAT/(T23 + T34 + T45) | 5.68 | (|Sag21| + |Sag22|)/CT2 | 0.20 |
| ΣAT/T56 | 1.85 | |SD11/SD62| | 0.88 |
| TL/ImgH | 2.03 | The quantity of the lens elements with Abbe # smaller than 30 | 3 |

7th Embodiment

Figure 13:
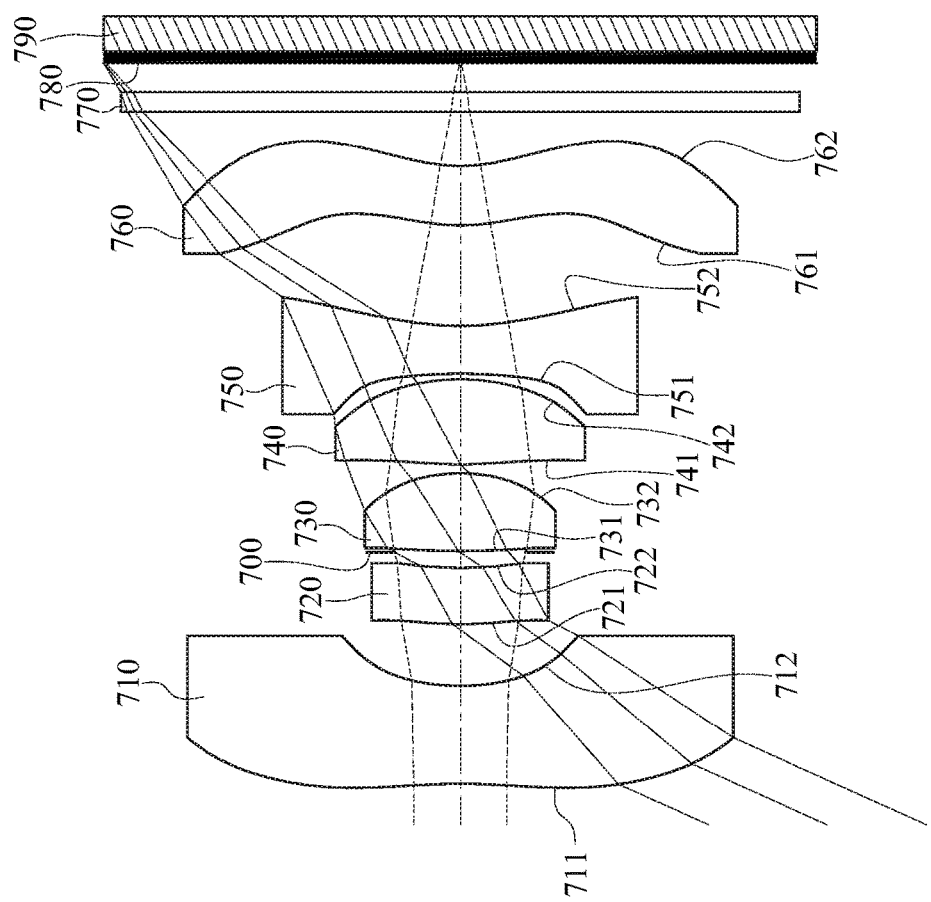
FIG. 13 is a schematic view of an image capturing unit according to the 7th embodiment of the present disclosure.
Figure 14:
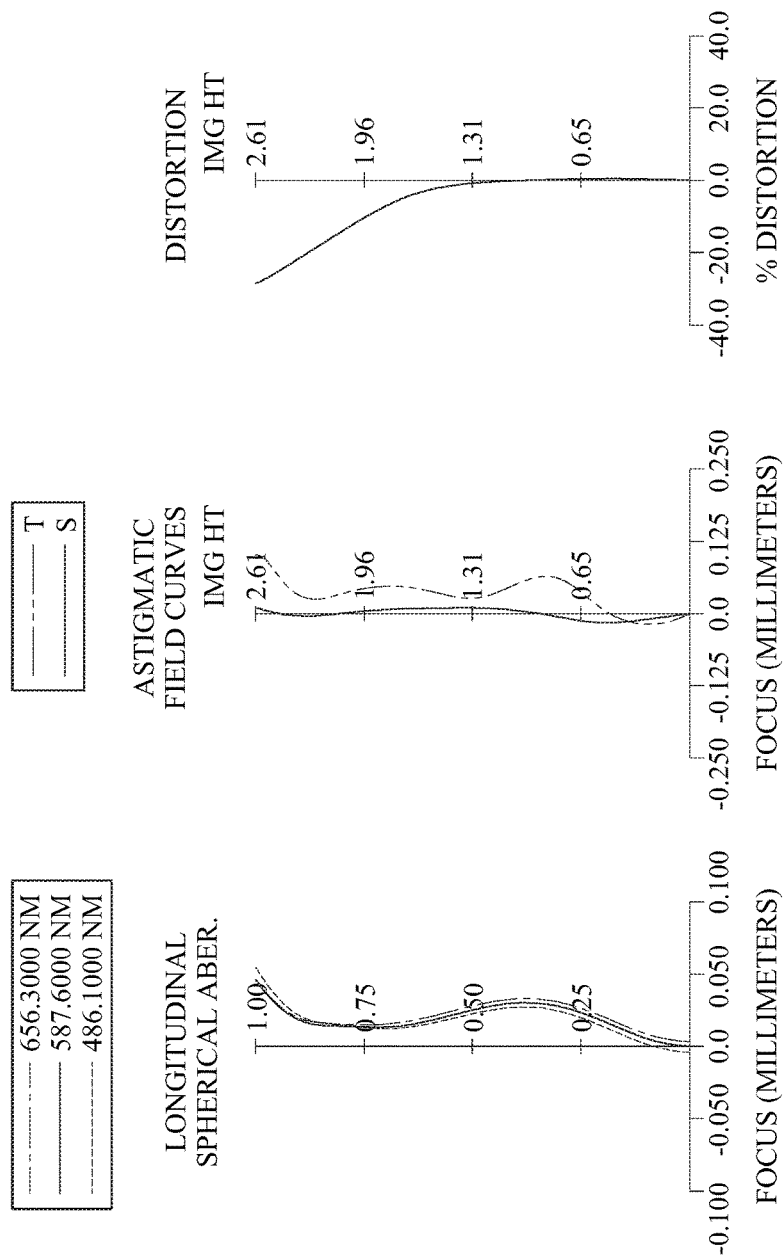
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens system (its reference numeral is omitted) of the present disclosure and an image sensor 790. The imaging lens system includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the imaging lens system has a total of six single and non-cemented lens elements (710-760).

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one convex shape in an off-axial region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one inflection point in an off-axial region thereof.

The IR-cut filter 770 is made of glass material and located between the sixth lens element 760 and the image surface 780, and will not affect the focal length of the imaging lens system. The image sensor 790 is disposed on or near the image surface 780 of the imaging lens system.

The detailed optical data of the 7th embodiment are shown in Table 13 and the aspheric surface data are shown in Table 14 below.

TABLE 13

7th Embodiment
f = 1.67 mm, Fno = 2.45, HFOV = 65.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.319 | (ASP) | 0.721 | Plastic | 1.545 | 56.1 | −2.20 |
| 2 | | 1.762 | (ASP) | 0.453 | | | | |
| 3 | Lens 2 | 3.048 | (ASP) | 0.410 | Plastic | 1.660 | 20.4 | 26.53 |
| 4 | | 3.493 | (ASP) | 0.114 | | | | |
| 5 | Ape. Stop | Plano | | 0.009 | | | | |
| 6 | Lens 3 | 6.955 | (ASP) | 0.569 | Plastic | 1.544 | 56.0 | 2.36 |
| 7 | | −1.528 | (ASP) | 0.065 | | | | |
| 8 | Lens 4 | 2.321 | (ASP) | 0.630 | Plastic | 1.544 | 56.0 | 1.71 |
| 9 | | −1.405 | (ASP) | 0.040 | | | | |
| 10 | Lens 5 | −4.093 | (ASP) | 0.350 | Plastic | 1.639 | 23.5 | −2.15 |
| 11 | | 2.139 | (ASP) | 0.736 | | | | |
| 12 | Lens 6 | 1.541 | (ASP) | 0.436 | Plastic | 1.639 | 23.5 | −60.52 |
| 13 | | 1.318 | (ASP) | 0.400 | | | | |
| 14 | IR-cut filter | Plano | | 0.145 | Glass | 1.517 | 64.2 | — |
| 15 | | Plano | | 0.213 | | | | |
| 16 | Image | Plano | | — | | | | |

Note:
Reference wavelength is 587.6 nm (d-line).
An effective radius of the object-side surface 711 (surface 1) is 2.000 mm.
An effective radius of the image-side surface 732 (surface 7) is 0.700 mm.

TABLE 14

Aspheric Coefficients

| Surface # | 1 | 2 | 3 | 4 | 6 | 7 |
|---|---|---|---|---|---|---|
| k = | 1.2747E+00 | −5.6686E+01 | −3.0248E+01 | −4.4740E+01 | −4.3238E+01 | 2.2193E+00 |
| A4 = | 1.5183E−01 | 1.0988E+00 | −5.7658E−02 | 2.0652E−01 | 2.7940E−03 | −8.6366E−01 |
| A6 = | −7.6713E−02 | −3.1546E+00 | −2.5882E−01 | −8.1909E+01 | 2.5571E−01 | 3.1182E+00 |
| A8 = | 2.9310E−02 | 9.3066E+00 | 2.5328E−01 | 8.8727E+00 | 2.1706E−01 | −7.9401E+00 |
| A10 = | −6.8975E−03 | −1.7810E+01 | −1.0432E+00 | −3.6092E+01 | −9.8652E+00 | 1.2849E+01 |
| A12 = | 9.1452E−04 | 1.9282E+01 | 9.3518E−01 | 5.9982E+01 | 4.1625E+01 | −1.2081E+01 |
| A14 = | −5.0591E−05 | −8.6743E+00 | — | — | −5.4744E+01 | 4.6325E+00 |

| Surface # | 8 | 9 | 10 | 11 | 12 | 13 |
|---|---|---|---|---|---|---|
| k = | −8.2123E+01 | −2.6774E+00 | 1.0566E+01 | −4.3326E+01 | −1.0582E+01 | −4.6002E+00 |
| A4 = | −2.4013E−01 | 1.7757E−01 | −1.2579E−01 | 1.0363E−01 | −5.2009E−02 | −8.7143E−02 |
| A6 = | 5.8978E−01 | −8.0129E−01 | 1.6152E+00 | 1.3688E−01 | −2.4741E−01 | −5.6008E−02 |
| A8 = | −6.1712E−01 | 9.4334E−01 | −8.4132E+00 | −6.1946E−01 | 2.2531E−01 | 8.0135E−02 |

TABLE 14-continued

| Aspheric Coefficients | | | | | |
|---|---|---|---|---|---|
| A10 = | 3.7789E−01 | −8.5814E−01 | 2.0959E+01 | 7.5505E−01 | −8.1391E−02 | −4.3424E−02 |
| A12 = | −1.5523E+00 | 6.2939E−02 | −3.1634E+01 | −4.5434E−01 | 1.3562E−02 | 1.2055E−02 |
| A14 = | 2.9434E+00 | 5.6224E−01 | 2.5406E+01 | 1.3946E−01 | −7.8947E−04 | −1.6873E−03 |
| A16 = | −1.6792E+00 | −1.3554E−01 | −8.0307E+00 | −1.7500E−02 | −1.6238E−05 | 9.4402E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.67 | TL/[f*tan(HFOV)] | 1.42 |
| f/EPD | 2.45 | (R1 + R2)/(R1 − R2) | 0.42 |
| HFOV [deg.] | 65.8 | (R5 + R6)/(R5 − R6) | 0.64 |
| FOV [deg.] | 131.6 | (R9 + R10)/(R9 − R10) | 0.31 |
| (V5 + V6)/V4 | 0.84 | \|R11 − R12\|/(R11 + R12)\| | 0.08 |
| CTmax/T56 | 0.98 | R12/f | 0.79 |
| T56/CT6 | 1.69 | \|f/R3\| + \|f/R4\| | 1.03 |
| ΣAT/(T23 + T34 + T45) | 6.21 | (\|Sag21\| + \|Sag22\|)/CT2 | 0.15 |
| ΣAT/T56 | 1.93 | \|SD11/SD62\| | 0.99 |
| TL/ImgH | 2.03 | The quantity of the lens elements with Abbe # smaller than 30 | 3 |

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising, in order from an object side to an image side:
   a first lens element having negative refractive power;
   a second lens element;
   a third lens element having positive refractive power;
   a fourth lens element having positive refractive power;
   a fifth lens element with negative refractive power having an image-side surface being concave in a paraxial region thereof, wherein an object-side surface and the image-side surface of the fifth lens element are both aspheric; and
   a sixth lens element having an image-side surface being concave in a paraxial region thereof, wherein the image-side surface of the sixth lens element has at least one inflection point in an off-axial region thereof, and an object-side surface and the image-side surface of the sixth lens element are both aspheric;
   wherein the imaging lens system has a total of six lens elements, and each of the lens elements of the imaging lens system is a single and non-cemented lens element; an axial distance between the fifth lens element and the sixth lens element is T56, a central thickness of the sixth lens element is CT6, a sum of axial distances between every two lens elements of the imaging lens system adjacent to each other is ΣAT, and the following conditions are satisfied:

$1.05 < T56/CT6 < 7.50$; and $1.0 < \Sigma AT/T56 < 2.25$.

2. The imaging lens system of claim 1, wherein a curvature radius of an object-side surface of the first lens element is R1, a curvature radius of an image-side surface of the first lens element is R2, and the following condition is satisfied:

$-1.50 < (R1+R2)/(R1-R2) < 2.0$.

3. The imaging lens system of claim 1, wherein the first lens element has an object-side surface being concave in a paraxial region thereof, and the object-side surface of the first lens element has at least one convex shape in an off-axial region thereof.

4. The imaging lens system of claim 1, wherein the axial distance between the fifth lens element and the sixth lens element is T56, the central thickness of the sixth lens element is CT6, and the following condition is satisfied:

$1.60 < T56/CT6 < 4.0$.

5. The imaging lens system of claim 1, wherein the axial distance between the fifth lens element and the sixth lens element is T56, the sum of axial distances between every two lens elements of the imaging lens system adjacent to each other is ΣAT, and the following condition is satisfied:

$1.20 < \Sigma AT/T56 < 2.10$.

6. The imaging lens system of claim 1, wherein a focal length of the imaging lens system is f, an entrance pupil diameter of the imaging lens system is EPD, a curvature radius of the object-side surface of the sixth lens element is R11, a curvature radius of the image-side surface of the sixth lens element is R12, and the following conditions are satisfied:

$1.0 < f/EPD < 3.0$; and $|(R11-R12)/(R11+R12)| < 0.35$.

7. The imaging lens system of claim 1, wherein an axial distance between an object-side surface of the first lens element and an image surface is TL, a focal length of the imaging lens system is f, half of a maximal field of view of the imaging lens system is HFOV, and the following condition is satisfied:

$TL/[(f*\tan(HFOV)] < 1.75$.

8. The imaging lens system of claim 1, wherein a focal length of the imaging lens system is f, a curvature radius of an object-side surface of the second lens element is R3, a curvature radius of an image-side surface of the second lens element is R4, and the following condition is satisfied:

$$|f/R3|+|f/R4|<1.50.$$

9. The imaging lens system of claim 1, wherein the sum of axial distances between every two lens elements of the imaging lens system adjacent to each other is ΣAT, an axial distance between the second lens element and the third lens element is T23, an axial distance between the third lens element and the fourth lens element is T34, an axial distance between the fourth lens element and the fifth lens element is T45, and the following condition is satisfied:

$$4<\Sigma AT/(T23+T34+T45)<25.$$

10. The imaging lens system of claim 1, wherein a curvature radius of the object-side surface of the fifth lens element is R9, a curvature radius of the image-side surface of the fifth lens element is R10, and the following condition is satisfied:

$$0<(R9+R10)/(R9-R10)<3.50.$$

11. The imaging lens system of claim 1, wherein a focal length of the imaging lens system is f, a curvature radius of the image-side surface of the sixth lens element is R12, and the following condition is satisfied:

$$0.20<R12/f<1.25.$$

12. The imaging lens system of claim 1, wherein a maximum among all central thicknesses of the lens elements of the imaging lens system is CTmax, the axial distance between the fifth lens element and the sixth lens element is T56, and the following condition is satisfied:

$$CTmax/T56<1.25.$$

13. The imaging lens system of claim 1, wherein an Abbe number of the fourth lens element is V4, an Abbe number of the fifth lens element is V5, an Abbe number of the sixth lens element is V6, and the following condition is satisfied:

$$0.30<(V5+V6)/V4<1.0.$$

14. The imaging lens system of claim 1, wherein a displacement in parallel with an optical axis from an axial vertex of an object-side surface of the second lens element to a maximum effective radius position of the object-side surface of the second lens element is Sag21, a displacement in parallel with the optical axis from an axial vertex of an image-side surface of the second lens element to a maximum effective radius position of the image-side surface of the second lens element is Sag22, a central thickness of the second lens element is CT2, and the following condition is satisfied:

$$(|Sag21|+|Sag22|)/CT2<0.25.$$

15. The imaging lens system of claim 1, wherein a curvature radius of an object-side surface of the third lens element is R5, a curvature radius of an image-side surface of the third lens element is R6, and the following condition is satisfied:

$$0.50<(R5+R6)/(R5-R6)<3.0.$$

16. An image capturing unit, comprising:
the imaging lens system of claim 1; and
an image sensor, wherein the image sensor is disposed on an image surface of the imaging lens system.

17. An electronic device, comprising:
the image capturing unit of claim 16.

18. An imaging lens system comprising, in order from an object side to an image side:
a first lens element having negative refractive power;
a second lens element;
a third lens element having positive refractive power;
a fourth lens element having positive refractive power;
a fifth lens element with negative refractive power having an image-side surface being concave in a paraxial region thereof, wherein an object-side surface and the image-side surface of the fifth lens element are both aspheric; and
a sixth lens element having an image-side surface being concave in a paraxial region thereof, wherein the image-side surface of the sixth lens element has at least one inflection point in an off-axial region thereof, and an object-side surface and the image-side surface of the sixth lens element are both aspheric;
wherein the imaging lens system has a total of six lens elements, and each of the lens elements of the imaging lens system is a single and non-cemented lens element; an axial distance between the fifth lens element and the sixth lens element is T56, a central thickness of the sixth lens element is CT6, a curvature radius of the object-side surface of the fifth lens element is R9, a curvature radius of the image-side surface of the fifth lens element is R10, and the following conditions are satisfied:

$$1.05<T56/CT6<7.50;\text{ and}$$

$$0.50<(R9+R10)/(R9-R10)<3.50.$$

19. The imaging lens system of claim 18, wherein a maximal field of view of the imaging lens system is FOV, an axial distance between an object-side surface of the first lens element and an image surface is TL, a maximum image height of the imaging lens system is ImgH, and the following conditions are satisfied:

$$100[\text{deg.}]<FOV<160[\text{deg.}];\text{ and}$$

$$1.0<TL/\text{ImgH}<2.30.$$

20. The imaging lens system of claim 18, wherein the curvature radius of the object-side surface of the fifth lens element is R9, the curvature radius of the image-side surface of the fifth lens element is R10, and the following condition is satisfied:

$$1.0<(R9+R10)/(R9-R10)<3.50.$$

21. The imaging lens system of claim 18, wherein a displacement in parallel with an optical axis from an axial vertex of an object-side surface of the second lens element to a maximum effective radius position of the object-side surface of the second lens element is Sag21, a displacement in parallel with the optical axis from an axial vertex of an image-side surface of the second lens element to a maximum effective radius position of the image-side surface of the second lens element is Sag22, a central thickness of the second lens element is CT2, and the following condition is satisfied:

$$(|Sag21|+|Sag22|)/CT2<0.25.$$

22. The imaging lens system of claim 18, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the x-th lens element is fx, and the following condition is satisfied:

$|fx|<|f2|$, wherein $x=1,3,4,5,6$.

23. The imaging lens system of claim 18, wherein at least three of the lens elements of the imaging lens system has an Abbe number smaller than 30.

24. The imaging lens system of claim 18, wherein a maximum effective radius of an object-side surface of the first lens element is SD11, a maximum effective radius of the image-side surface of the sixth lens element is SD62, and the following condition is satisfied:

$|SD11/SD62|<1.20$.

25. An electronic device, comprising:
an image capturing unit comprising the imaging lens system of claim 18 and an image sensor, wherein the image sensor is disposed on an image surface of the imaging lens system.

* * * * *